US011958287B2

(12) United States Patent
Ishimoto et al.

(10) Patent No.: US 11,958,287 B2
(45) Date of Patent: Apr. 16, 2024

(54) CARTRIDGE

(71) Applicant: SEIKO EPSON CORPORATION, Tokyo (JP)

(72) Inventors: Akio Ishimoto, Shiojiri (JP); Taishi Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 367 days.

(21) Appl. No.: 17/419,117

(22) PCT Filed: Dec. 23, 2019

(86) PCT No.: PCT/JP2019/050323
§ 371 (c)(1),
(2) Date: Jun. 28, 2021

(87) PCT Pub. No.: WO2020/137958
PCT Pub. Date: Jul. 2, 2020

(65) Prior Publication Data

US 2022/0016915 A1 Jan. 20, 2022

(30) Foreign Application Priority Data

Dec. 26, 2018 (JP) ................................ 2018-243216

(51) Int. Cl.
*B41J 3/407* (2006.01)
*B41J 15/04* (2006.01)

(52) U.S. Cl.
CPC ........... *B41J 15/044* (2013.01); *B41J 3/4075* (2013.01)

(58) Field of Classification Search
CPC .............................. B41J 15/044; B41J 3/4075
See application file for complete search history.

(56) References Cited

U.S. PATENT DOCUMENTS 5,358,351 A * 10/1994 Murata .................... B41J 32/00 400/621
2012/0027493 A1 2/2012 Yap et al.
(Continued)

FOREIGN PATENT DOCUMENTS

CN 103124639 A 5/2013
JP S63-156762 U 10/1988
(Continued)

OTHER PUBLICATIONS

Feb. 10, 2020 International Search Report issued in International Patent Application No. PCT/JP2019/050323.

*Primary Examiner* — Sharon Polk
(74) *Attorney, Agent, or Firm* — Oliff PLC

(57) ABSTRACT

A cartridge that makes it possible to simultaneously set a printing tape and a cartridge in a tape printing device. A cartridge to be installed in a tape printing device includes: a cartridge case; a cartridge-side tape introduction port that introduces a printing tape introduced from a device-side tape introduction port into the cartridge case and a cartridge-side tape ejection port that ejects the printing tape to an outside of the cartridge case toward a device-side tape ejection port in a state in which the cartridge is installed in a cartridge installation part; and a tape retention part that retains the printing tape that is introduced in advance into a tape path between the cartridge-side tape introduction port and the cartridge-side tape ejection port before the cartridge is installed in the cartridge installation part.

6 Claims, 24 Drawing Sheets

(56) References Cited

U.S. PATENT DOCUMENTS

| | | | |
|---|---|---|---|
| 2018/0257397 | A1 | 9/2018 | Kubota |
| 2020/0207131 | A1 | 7/2020 | Ishimoto et al. |

FOREIGN PATENT DOCUMENTS

| | | | |
|---|---|---|---|
| JP | 2010-120211 | A | 6/2010 |
| JP | 2017-024324 | A | 2/2017 |
| JP | 2018-149701 | A | 9/2018 |
| WO | 2019-189710 | A1 | 10/2019 |

* cited by examiner

CARTRIDGE

TECHNICAL FIELD

The present invention relates to a cartridge to be installed in a tape printing device.

BACKGROUND ART

Conventionally, a printing device that includes a housing in which a supply part and an ejection part open into lateral surfaces, and that performs printing on a tube while transporting the tube that ranges from the supply part to the ejection part and is installed in an installation part has been known as disclosed in Patent Document 1.

[Patent Document 1] JP-A-2017-024324

DISCLOSURE OF THE INVENTION

In a conventional printing device, a user is required to, when installing a tube serving as a printing medium in an installation part before and after installing a ribbon cassette, perform the complicated operation of moving a transporting roller to a retracting position through the manipulation of an opening/closing cover, grasping and installing the tube in the installation part so as to extend from a supply part to an ejection part, and moving a transporting roller to an operation position through the manipulation of the opening/closing cover again.

A cartridge according to the present invention is a cartridge to be installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case, the cartridge including: a cartridge case, the cartridge case having a cartridge-side tape introduction port that introduces the printing tape introduced from the device-side tape introduction port into the cartridge case and a cartridge-side tape ejection port that ejects the printing tape to the outside of the cartridge case toward the device-side tape ejection port in a state in which the cartridge is installed in the cartridge installation part, the cartridge including a tape retention part that retains the printing tape that is introduced in advance into a tape path between the cartridge-side tape introduction port and the cartridge-side tape ejection port before the cartridge is installed in the cartridge installation part.

BEST MODES FOR CARRYING OUT THE INVENTION

Figure 1:
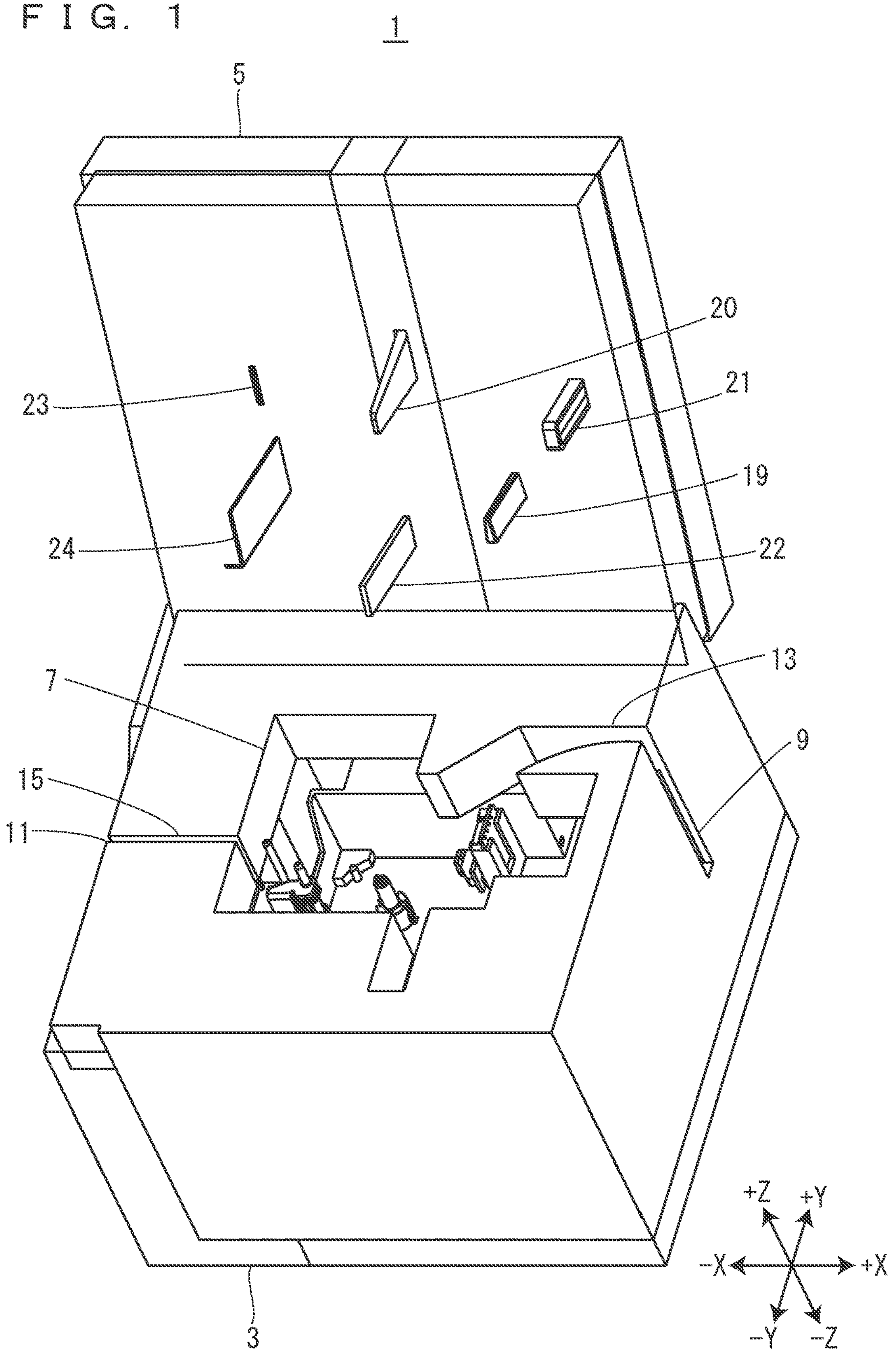
FIG. 1 is a perspective view of a tape printing device.

Directions in the following drawings will be defined. The vertical direction of a tape printing device 1 is defined as a Z direction, a longitudinal direction orthogonal to the Z direction is defined as an X direction, and a cross direction orthogonal to the Z direction and the X direction is defined as a Y direction. In the Z direction, a lower direction or a gravity direction is defined as a −Z direction, and an upper direction is defined as a +Z direction. In the Y direction, one direction is defined as a +Y direction, and a direction opposite to the one direction is defined as a −Y direction. In FIG. 1, the rotational shaft side of an installation-part cover 5 is defined as the +Y direction. In the X direction, one direction is defined as a +X direction, and a direction opposite to the one direction is defined as a −X direction. In FIG. 1, a right side in a plan view is defined as the +X direction. Note that these directions are given only for the convenience of descriptions and do not intend to limit the following embodiments at all as a matter of course.

[Overviews of Tape Printing Device, Tape Cartridge, and Ribbon Cartridge]

The overviews of the tape printing device 1, a tape cartridge 101, and a ribbon cartridge 201 will be described on the basis of FIGS. 1 to 3. In the tape printing device 1, the tape cartridge 101 and the ribbon cartridge 201 are alternatively installed.

Figure 2:
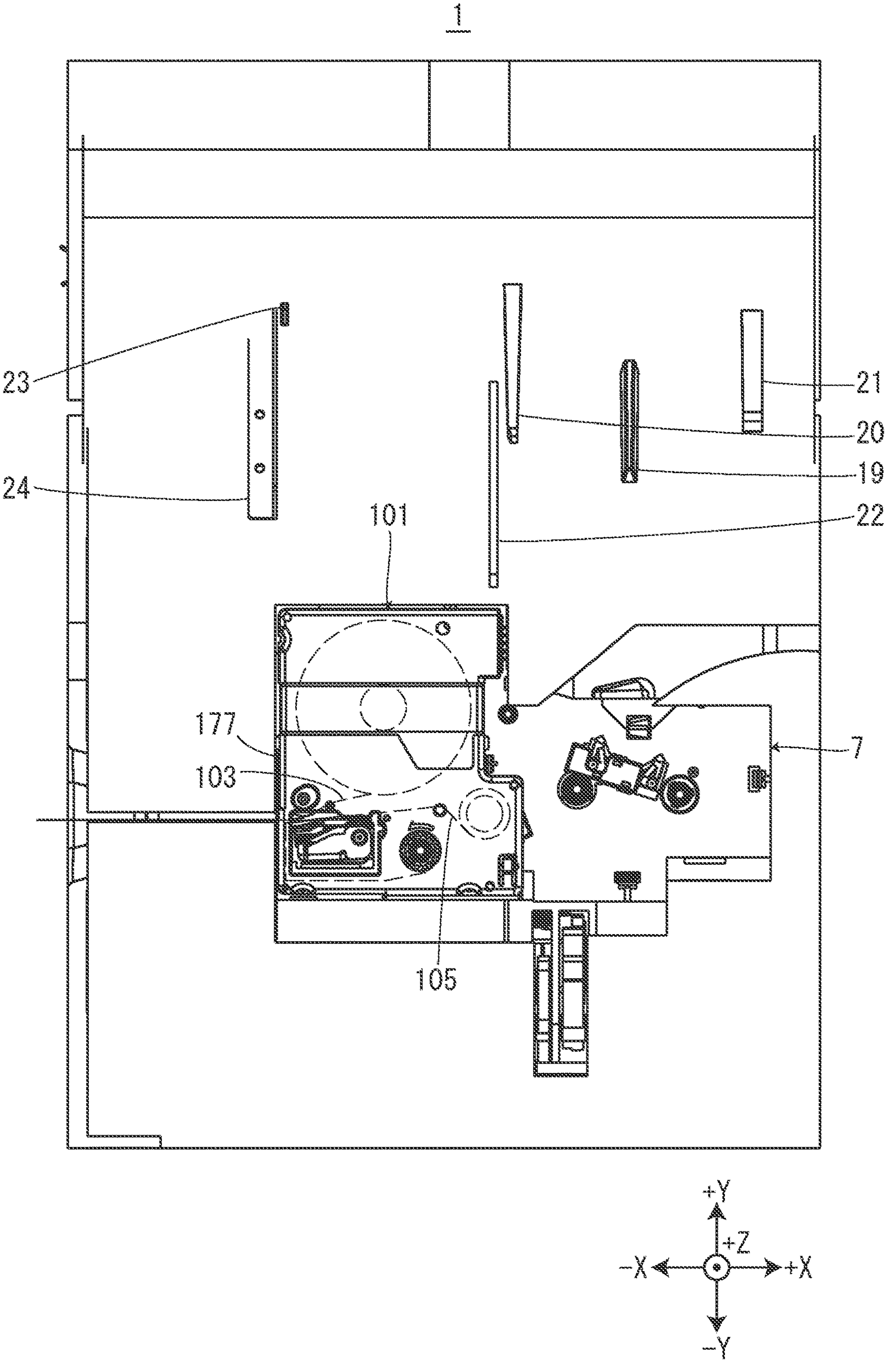
FIG. 2 is a view of the tape printing device with a tape cartridge installed therein when seen from a front side in an installation direction.

As shown in FIG. 2, a first printing tape 103 and a first ink ribbon 105 are accommodated in the tape cartridge 101. In a state in which the tape cartridge 101 is installed in a cartridge installation part 7, the tape printing device 1 performs printing on the first printing tape 103, while feeding the first printing tape 103 and the first ink ribbon 105 accommodated in the tape cartridge 101.

Figure 3:
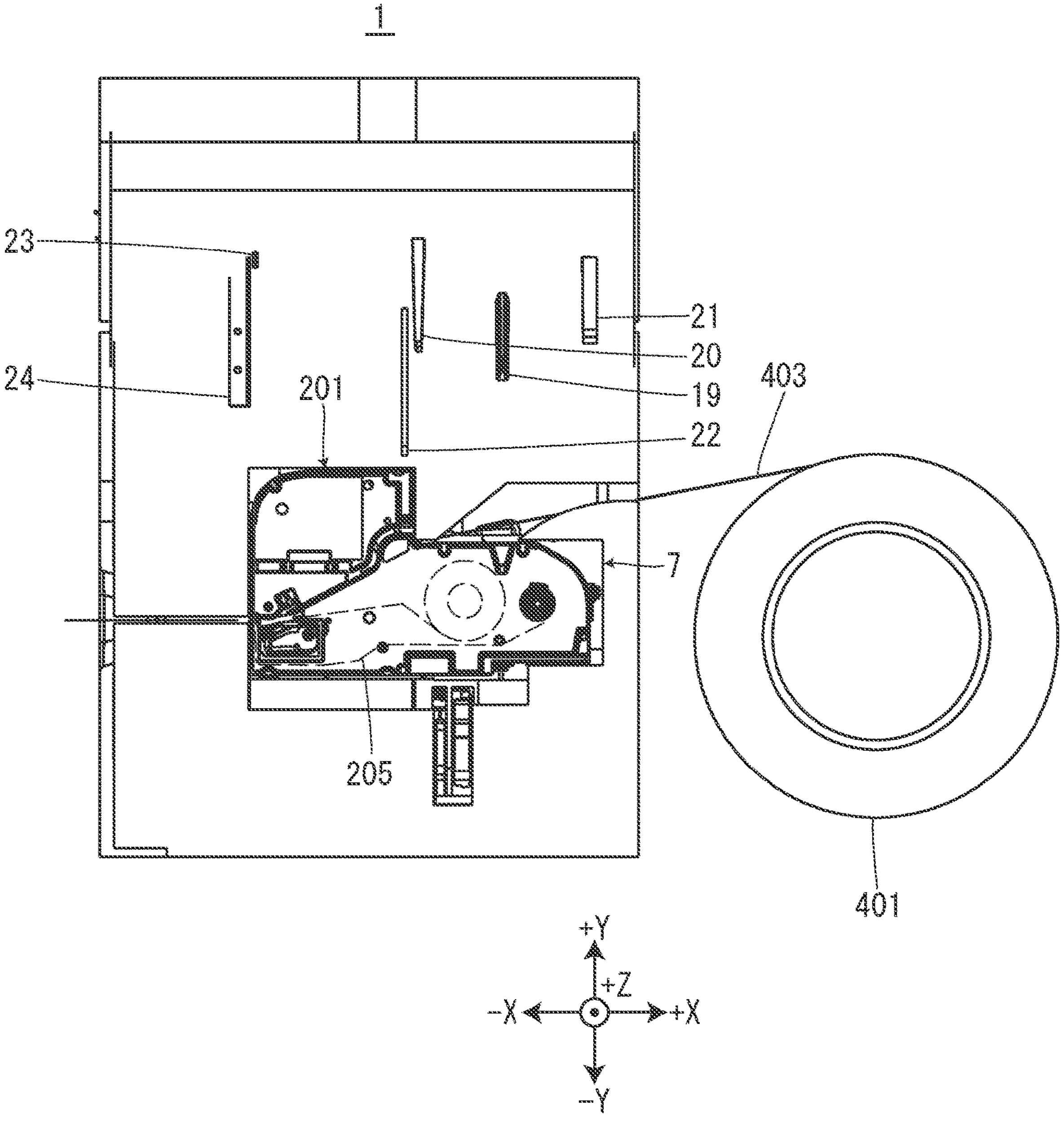
FIG. 3 is a view of the tape printing device with a ribbon cartridge installed therein when seen from the front side in the installation direction.

As shown in FIG. 3, a second ink ribbon 205 is accommodated in the ribbon cartridge 201. In a state in which the ribbon cartridge 201 is installed in the cartridge installation part 7, a second printing tape 403 that has been paid out from a tape roll 401 provided outside the tape printing device 1 is introduced into the tape printing device 1. The tape printing device 1 performs printing on the second printing tape 403, while feeding the introduced second printing tape 403 and the second ink ribbon 205 accommodated in the ribbon cartridge 201.

Note that the length of the second printing tape 403 in the tape roll 401 that has not been used and the length of the second ink ribbon 205 accommodated in the ribbon cartridge 201 that has not been used are not particularly limited but are longer than the length of the first printing tape 103 and the length of the first ink ribbon 105 accommodated in the tape cartridge 101 that has not been used, respectively, in the present embodiment. Therefore, the ribbon cartridge 201 is installed, for example, when large amounts of labels are created at once.

[Tape Printing Device]

Figure 4:
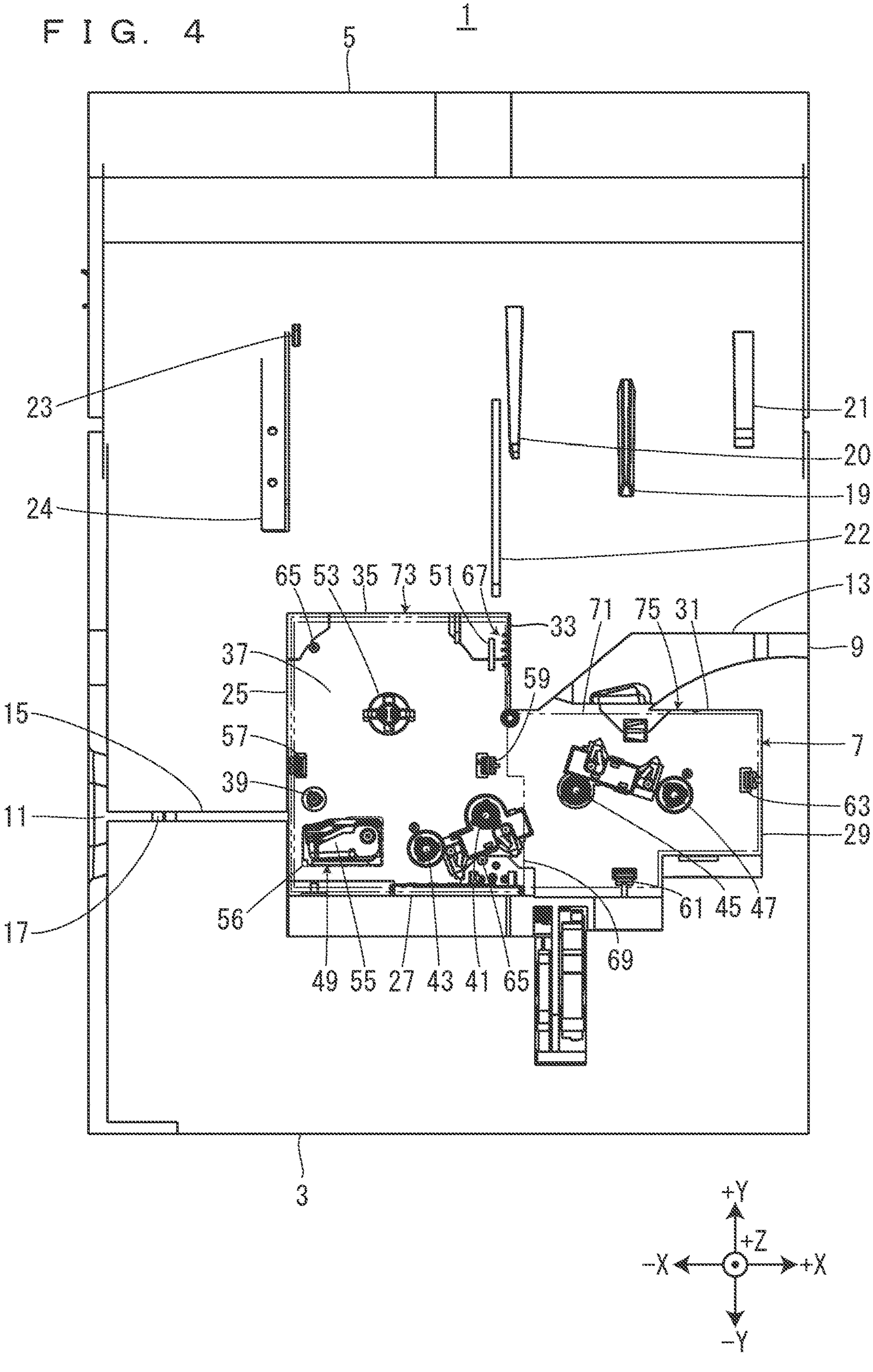
FIG. 4 is a view of the tape printing device when seen from the front side in the installation direction.

The tape printing device 1 will be described on the basis of FIG. 4. The tape printing device 1 includes a device case 3, the installation-part cover 5, and the cartridge installation part 7. The device case 3 is formed into a substantially cuboid shape. The device case 3 has a device-side tape introduction port 9 for the second printing tape 403 paid out from the tape roll 401 on its +X-side surface, and has a device-side tape ejection port 11 shared between the tape cartridge 101 and the ribbon cartridge 201 on its −X-side surface. The device-side tape introduction port 9 introduces the second printing tape 403 from the outside to the inside of the device case 3. The device-side tape ejection port 11 ejects the introduced second printing tape 403 to the outside of the device case 3. Further, the device-side tape ejection port 11 ejects the first printing tape 103 delivered from the tape cartridge 101 installed in the cartridge installation part 7 to the outside of the device case 3. The device-side tape introduction port 9 and the device-side tape ejection port 11 are formed into a slit shape extending in the Z direction. Further, in a tape feeding path inside the tape printing device 1, a direction in which the second printing tape 403 is directed from the device-side tape introduction port 9 to the device-side tape ejection port 11 is defined as a downstream, and a direction opposite to the above direction is defined as an upstream.

The device case 3 has a tape introduction path 13 that connects the device-side tape introduction port 9 and the cartridge installation part 7 to each other. Further, the device case 3 has a tape ejection path 15 that connects the cartridge installation part 7 and the device-side tape ejection port 11 to each other. The tape introduction path 13 and the tape ejection path 15 are formed into a groove shape having an opening on the +Z side. The tape ejection path 15 has a cutter 17. The cutter 17 cuts off the first printing tape 103 or the second printing tape 403 in the tape ejection path 15.

The installation-part cover 5 opens/closes the cartridge installation part 7. The installation-part cover 5 has a first pressing protrusion 19, a second pressing protrusion 20, a third pressing protrusion 21, a fourth pressing protrusion 22, a fifth pressing protrusion 23, and a sixth pressing protrusion 24 on its inside surface. The installation-part cover 5 has a keyboard and a display on its outside surface although not shown in the figure. The keyboard receives input operations to input printing information such as character strings and issue various instructions to perform printing or the like. The display displays various information besides printing information input via the keyboard. The display has a rotation shaft serving as a hinge, and is configured to be accommodatable in the installation-part cover 5. When the display is accommodated in the installation-part cover 5, the display surface of the display faces the keyboard. When the keyboard receives an input operation to perform printing, the tape printing device 1 performs printing processing on the basis of printing information input via the keyboard. Note that the tape printing device 1 may be configured to include input display means such as a touch panel type display instead of the keyboard and the display. Further, the tape printing device 1 may be configured to perform printing processing on the basis of printing data and a command received from an external device such as a personal computer and a smart phone. In other words, a printing system in which the tape printing device 1 and an external device serving as an operation terminal are combined together may be configured. When the tape printing device 1 is configured to be connectable to such an external device, the keyboard and the display may or may not be provided in the tape printing device 1.

The cartridge installation part 7 is formed into a concave shape having an opening on the +Z side. Here, in the inner peripheral surface of the cartridge installation part 7, an inner peripheral surface on the −X side is defined as a first installation inner peripheral surface 25. An inner peripheral surface extending to the +X side from the end on the −Y side of the first installation inner peripheral surface 25 is defined as a second installation inner peripheral surface 27. An inner peripheral surface extending to the +Y side from the end on the +X side of the second installation inner peripheral surface 27 is defined as a third installation inner peripheral surface 29. An inner peripheral surface extending to the −X side from the end on the +Y side of the third installation inner peripheral surface 29 is defined as a fourth installation inner peripheral surface 31. An inner peripheral surface extending to the +Y side from the end on the −X side of the fourth installation inner peripheral surface 31 is defined as a fifth installation inner peripheral surface 33. An inner peripheral surface extending to the −X side from the end on the +Y side of the fifth installation inner peripheral surface 33 is defined as a sixth installation inner peripheral surface 35. The end on the −X side of the sixth installation inner peripheral surface 35 is connected to the end on the +Y side of the first installation inner peripheral surface 25. The downstream end of the tape introduction path 13 opens into the fourth installation inner peripheral surface 31. The upstream end of the tape ejection path 15 opens into the first installation inner peripheral surface 25.

The cartridge installation part 7 has, on its bottom surface, i.e., its −Z-side surface, a platen shaft 39, a first winding shaft 43, a first paying-out shaft 41, a second paying-out shaft 45, and a second winding shaft 47 provided to protrude to the +Z side in an order from the −X side.

The platen shaft 39 has a larger protrusion amount with respect to a front side in an installation direction than the first paying-out shaft 41, the first winding shaft 43, the second paying-out shaft 45, and the second winding shaft 47. When the tape cartridge 101 or the ribbon cartridge 201 is installed in the cartridge installation part 7, the platen shaft 39 is inserted into a first platen roller 109 or a second platen roller 203 that will be described later to guide the installation of the tape cartridge 101 or the ribbon cartridge 201. Note that the installation direction of the tape cartridge 101 and the ribbon cartridge 201 will be simply defined as an "installation direction" below, and the installation direction is parallel to a direction in which the platen shaft 39 extends, i.e., the Z direction. Further, the front side in the installation direction indicates the +Z side, and a back side in the installation direction indicates the −Z side.

Further, the cartridge installation part 7 has, on the installation bottom surface 37, a head part 49, an engagement convex part 51, and an insertion convex part 53 provided to protrude to the front side in the installation direction. The head part 49 is positioned on the −Y side of the platen shaft 39. The head part 49 includes a printing head 55 and a head cover 56 that covers at least the +X side, the −Y side, and the front side in the installation direction of the printing head 55. The printing head 55 is a thermal head including a heat generation element. The head cover 56 is formed into a substantially rectangular shape when seen from the front side in the installation direction. When the tape cartridge 101 or the ribbon cartridge 201 is installed in the cartridge installation part 7, the head cover 56 guides the installation of the tape cartridge 101 or the ribbon cartridge 201 together with the platen shaft 39. In FIG. 4, the head cover 56 is imaginarily indicated by two-dot chain lines in order to show the printing head 55. Note that the head cover 56 and the platen shaft 39 are an example of a positioning part. The engagement convex part 51 is positioned close to a corner part at which the fifth installation inner peripheral surface 33 and the sixth installation inner peripheral surface 35 cross each other, and formed into a plate shape facing the fifth installation inner peripheral surface 33. That is, the engagement convex part 51 is formed into a substantially rectangular shape long in the Y direction when seen from the front side in the installation direction. Further, the engagement convex part 51 protrudes from the installation bottom surface 37 in a cantilevered state. The insertion convex part 53 is positioned at a substantially intermediate part between the engagement convex part 51 and the platen shaft 39, and formed into a substantially-stepped cylindrical shape having a larger diameter on the back side in the installation direction and a smaller diameter on the front side in the installation direction.

In addition, the cartridge installation part 7 has, on the installation bottom surface 37, a first hook 57, a second hook 59, a third hook 61, and a fourth hook 63 provided to protrude to the front side in the installation direction. The first hook 57 is positioned on the +Y side of the platen shaft 39 and at the end on the −X side of the installation bottom surface 37. The second hook 59 is positioned on the +Y side of the first paying-out shaft 41 and at a position facing the first hook 57 in the X direction. The third hook 61 is positioned on the −Y side of a substantially intermediate position between the second paying-out shaft 45 and the second winding shaft 47 and at the end on the −Y side of the installation bottom surface 37. The fourth hook 63 is positioned on the +X side of the second winding shaft 47 and at the end on the +X side of the installation bottom surface 37. Further, the cartridge installation part 7 has, on the installation bottom surface 37, a plurality of positioning pins 65 provided to protrude to the front side in the installation direction.

The cartridge installation part 7 has, on the fifth installation inner peripheral surface 33, a substrate connection part 67 provided to face the engagement convex part 51 on the +X side of the engagement convex part 51. The substrate connection part 67 is connected to a control circuit (not shown) that controls the respective parts of the tape printing device 1.

Here, in the cartridge installation part 7, a region in which the tape cartridge 101 is attachably and detachably installed and a region in which the ribbon cartridge 201 is attachably and detachably installed are, when seen from the front side in the installation direction, defined as a first installation region 69 and a second installation region 71, respectively. The first installation region 69 corresponds to a region surrounded by the substantially half part on the −X side of the second installation inner peripheral surface 27, the first installation inner peripheral surface 25, the sixth installation inner peripheral surface 35, and the fifth installation inner peripheral surface 33. The second installation region 71 corresponds to the substantially whole region of the cartridge installation part 7. In FIG. 4, each of the outer edge of the first installation region 69 and the outer edge of the second installation region 71 is indicated by two-dot chain lines.

A region in which the first installation region 69 and the second installation region 71 overlap each other, i.e., a region surrounded by the substantially half part on the −X side of the second installation inner peripheral surface 27, the first installation inner peripheral surface 25, the sixth installation inner peripheral surface 35, and the fifth installation inner peripheral surface 33 is defined as an overlap region 73. A region in which the first installation region 69 and the second installation region 71 do not overlap each other and which is composed of only the second installation region 71, i.e., a region surrounded by the substantially half part on the +X side of the second installation inner peripheral surface 27, the third installation inner peripheral surface 29, and the fourth installation inner peripheral surface 31 is defined as a non-overlap region 75. In the overlap region 73, the tape cartridge 101 and the ribbon cartridge 201 are commonly installed. In the non-overlap region 75, only the ribbon cartridge 201 is installed. By the provision of the overlap region 73 in which the tape cartridge 101 and the ribbon cartridge 201 are commonly installed as described above, it is possible to attain the miniaturization and cost reduction of the tape printing device 1.

The platen shaft 39, the first paying-out shaft 41, the first winding shaft 43, the head part 49, the engagement convex part 51, the insertion convex part 53, the first hook 57, the second hook 59, and the substrate connection part 67 are positioned in the overlap region 73. Since the head part 49 is provided in the overlap region 73, it is possible to share the costly printing head 55 between the tape cartridge 101 and the ribbon cartridge 201 and attain the cost reduction of the tape printing device 1. On the other hand, the second paying-out shaft 45, the second winding shaft 47, the third hook 61, and the fourth hook 63 are positioned in the non-overlap region 75.

Figure 5:
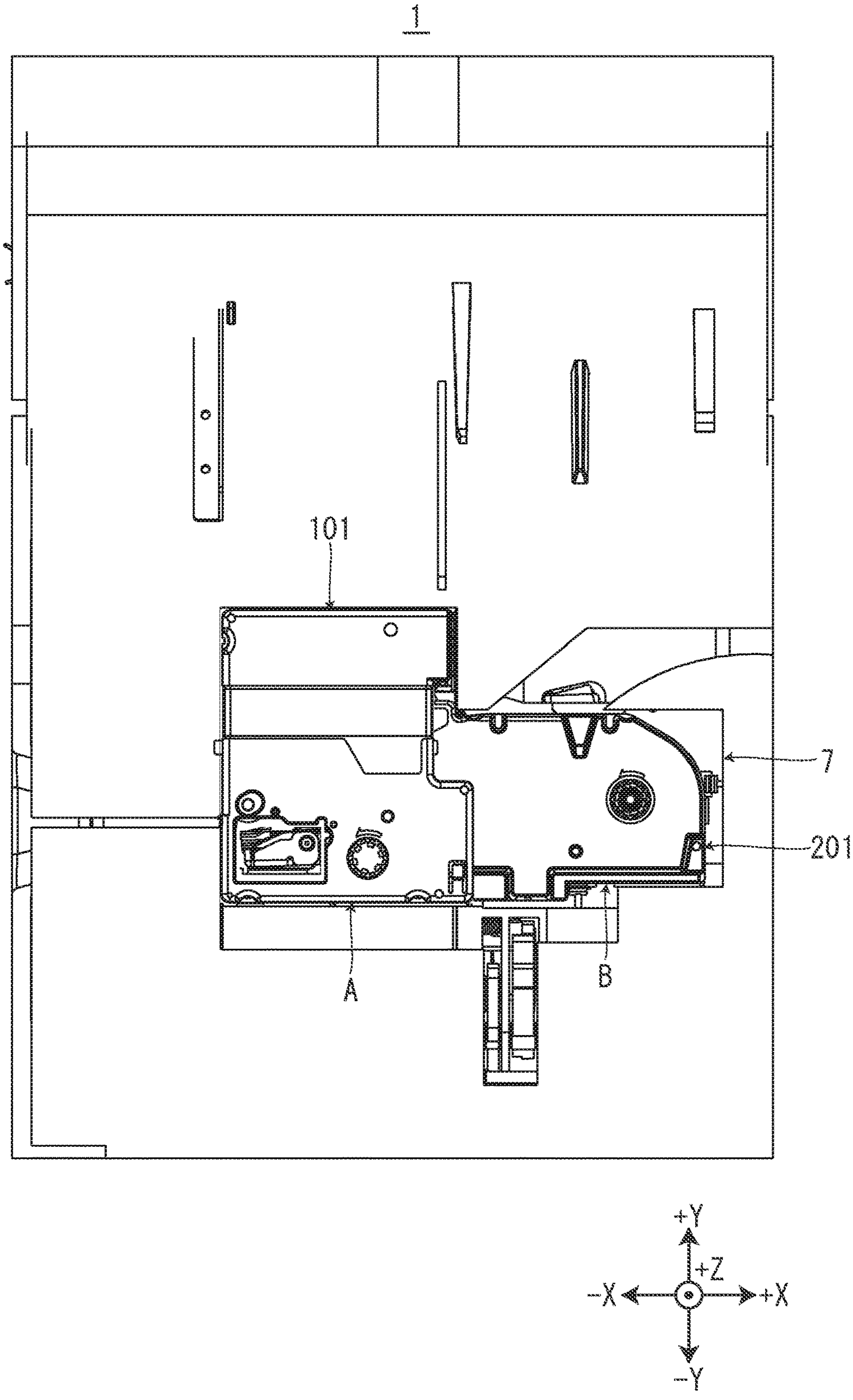
FIG. 5 is a view showing a state in which the tape cartridge is caused to overlap the ribbon cartridge that has been installed in a cartridge installation part on the front side in the installation direction so as to be placed at a position corresponding to a position at which the tape cartridge is installed in a cartridge installation part.

FIG. 5 is a view showing a state in which the tape cartridge 101 is caused to overlap the ribbon cartridge 201 that has been installed in the cartridge installation part 7 on the front side in the installation direction so as to be placed at a position corresponding to a position at which the tape cartridge 101 is installed in the cartridge installation part 7. Here, the position corresponding to the position at which the tape cartridge 101 is installed in the cartridge installation part 7 is a position shifted to the front side in the installation direction from the position at which the tape cartridge 101 is installed in the cartridge installation part 7. As shown in FIG. 5, the ribbon cartridge 201 has, when seen from the front side in the installation direction, an overlap portion A that overlaps the tape cartridge 101 and a non-overlap portion B that does not overlap the tape cartridge 101 and is composed of only the ribbon cartridge 201. Since the ribbon cartridge 201 has the overlap portion A that overlaps the tape cartridge 101 as described above, it is possible to commonly install the tape cartridge 101 and the ribbon cartridge 201 in a partial region of the cartridge installation part 7. Thus, it is possible to attain the miniaturization and cost reduction of the tape printing device 1.

[Ribbon Cartridge]

The ribbon cartridge 201 will be described on the basis of FIGS. 6 to 8. The ribbon cartridge 201 includes the second platen roller 203, a second paying-out core 206, a second winding core 207, a retention tip end 209, and a second cartridge case 211 that accommodates the second platen roller 203, the second paying-out core 206, the second winding core 207, and the retention tip end 209. The second platen roller 203, the second paying-out core 206, and the second winding core 207 are, when seen from the front side in the installation direction, provided at positions corresponding to the platen shaft 39, the second paying-out shaft 45, and the second winding shaft 47 provided in the cartridge installation part 7, respectively. The second platen roller 203 has a second platen shaft insertion hole 213 penetrating in the installation direction. The second ink ribbon 205 is wound on the second paying-out core 206. The second ink ribbon 205 that has been paid out from the second paying-out core 206 is wound up by the second winding core 207. Note that the second cartridge case 211 includes a plurality of types having different thicknesses, i.e., different dimensions in the installation direction depending on the width of the accommodated second ink ribbon 205.

The second cartridge case 211 is, when seen from the front side in the installation direction, formed into a shape substantially similar to the cartridge installation part 7. The second cartridge case 211 has, when seen from the front side in the installation direction, a shape different from that of a first cartridge case 115. Here, in the peripheral wall part of the second cartridge case 211, a peripheral wall part on the −X side is defined as a ribbon-side first peripheral wall part 215. A peripheral wall part extending to the +X side from the end on the −Y side of the ribbon-side first peripheral wall part 215 is defined as a ribbon-side second peripheral wall part 217. A peripheral wall part extending to the +Y side from the end on the +X side of the ribbon-side second peripheral wall part 217 is defined as a ribbon-side third peripheral wall part 219. A peripheral wall part extending to the −X side via a first curvature surface 221 from the end on the +Y side of the ribbon-side third peripheral wall part 219 is defined as a ribbon-side fourth peripheral wall part 223. A peripheral wall part extending to the +Y side from the end on the −X side of the ribbon-side fourth peripheral wall part 223 is defined as a ribbon-side fifth peripheral wall part 225. A peripheral wall part extending to the −X side from the end on the +Y side of the ribbon-side fifth peripheral wall part 225 is defined as a ribbon-side sixth peripheral wall part 227. The end on the −X side of the ribbon-side sixth peripheral wall part 227 is connected to the end on the +Y side of the ribbon-side first peripheral wall part 215 via a second curvature surface 229. Between the ribbon-side fourth peripheral wall part 223 and the ribbon-side sixth peripheral wall part 227, a step is formed by the ribbon-side fifth peripheral wall part 225. Further, an internal angle α formed between the ribbon-side fourth peripheral wall part 223 and the ribbon-side fifth peripheral wall part 225 exceeds 180° and is, for example, approximately 270° when seen from the front side in the installation direction. Note that the ribbon-side fourth peripheral wall part 223 and the ribbon-side fifth peripheral wall part 225 are an example a first peripheral wall part and a second peripheral wall part, respectively.

The second cartridge case 211 has a second head insertion hole 231 provided to penetrate in the installation direction. The second head insertion hole 231 is, when seen from the front side in the installation direction, positioned at a corner part at which the ribbon-side first peripheral wall part 215 and the ribbon-side second peripheral wall part 217 cross each other. The second head insertion hole 231 is arranged along the ribbon-side first peripheral wall part 215 and the ribbon-side second peripheral wall part 217. The second head insertion hole 231 is, when seen from the front side in the installation direction, formed into a shape corresponding to the head cover 56, i.e., a substantially rectangular shape. When the ribbon cartridge 201 is attached to and detached from the cartridge installation part 7, the second head insertion hole 231 and the second platen shaft insertion hole 213 position the ribbon cartridge 201 and guide the attachment and detachment of the ribbon cartridge 201.

The second cartridge case 211 includes a front-side case and a second back-side case 237. The front-side case is divided into a ribbon-part front-side case 233 and a tape-retention-part front-side case 235. When the ribbon cartridge 201 is installed in the cartridge installation part 7, the ribbon-part front-side case 233 and the tape-retention-part front-side case 235 are arranged on the front side in the installation direction, while the second back-side case 237 is arranged on the back side in the installation direction. The ribbon-part front-side case 233 and the tape-retention-part front-side case 235 are resin-molded articles having translucency, and the second back-side case 237 is a resin-molded article having no translucency. However, the materials and manufacturing methods of the ribbon-part front-side case 233, the tape-retention-part front-side case 235, and the second back-side case 237 are not limited to those described above.

The ribbon-part front-side case 233 includes a ribbon-part front-side wall part 239 and a ribbon-part front-side peripheral wall part 241 protruding to the back side in the installation direction from the peripheral edge part of the ribbon-part front-side wall part 239. The tape-retention-part front-side case 235 includes a tape-retention-part front-side wall part 243 and a tape-retention-part front-side peripheral wall part 245 protruding to the back side in the installation direction from the peripheral edge part of the tape-retention-part front-side wall part 243. The second back-side case 237 includes a second back wall part 247 and a ribbon-part back-side peripheral wall part 249 and a tape-retention-part back-side peripheral wall part 251 protruding to the front side in the installation direction from the second back wall part 247.

The ribbon-part front-side case 233 and the second back-side case 237 are combined together so as to make the ribbon-part front-side peripheral wall part 241 and the ribbon-part back-side peripheral wall part 249 butted against each other, and constitute the outer shell of an ink ribbon accommodation part 253 that accommodates the second ink ribbon 205. The tape-retention-part front-side case 235 and the second back-side case 237 are combined together so as to make the tape-retention-part front-side peripheral wall part 245 and the tape-retention-part back-side peripheral wall part 251 butted against each other, and constitute the outer shell of a tape-retention-mechanism accommodation part 255 that accommodates the second platen roller 203 and the retention tip end 209. That is, the ink ribbon accommodation part 253 and the tape-retention-mechanism accommodation part 255 are integrally formed via the second back wall part 247. Note that a tape retention part 305 accommodated in the tape-retention-mechanism accommodation part 255 will be described later.

The ribbon-part front-side case 233 has a first peripheral wall concave part 267, a second peripheral wall concave part 269, a third peripheral wall concave part 271, and a fourth peripheral wall concave part 272. The first peripheral wall concave part 267 is formed into a concave shape from the ribbon-part front-side wall part 239 to the back side in the installation direction at the end on the +X side of the ribbon-side fourth peripheral wall part 223. The second peripheral wall concave part 269 is formed into a groove shape extending in the installation direction at the substantially intermediate part in the X direction of the ribbon-side second peripheral wall part 217. The third peripheral wall concave part 271 is formed into a concave shape from the ribbon-part front-side wall part 239 to the back side in the installation direction at the end on the −Y side of the ribbon-side third peripheral wall part 219. The fourth peripheral wall concave part 272 is formed into a concave shape from the tape-retention-part front-side wall part 243 to the back side in the installation direction at the end on the +Y side of the ribbon-side fifth peripheral wall part 225. Further, the ribbon-part back-side peripheral wall part 249 has a peripheral wall convex part 273 provided to protrude to the front side in the installation direction at its position corresponding to the second peripheral wall concave part 269.

Here, the bottom surface of the first peripheral wall concave part 267, the protrusion tip end surface of the peripheral wall convex part 273, and the bottom surface of the third peripheral wall concave part 271 are defined as a first pressing part 275, a second pressing part 277, and a third pressing part 279, respectively. The first pressing part 275, the second pressing part 277, and the third pressing part 279 are, when seen from the front side in the installation direction, provided to surround the second paying-out core 206 and the second winding core 207. Further, the first pressing part 275, the second pressing part 277, and the third pressing part 279 are provided at positions corresponding to the first pressing protrusion 19, the second pressing protrusion 20, and the third pressing protrusion 21 provided on the installation-part cover 5, respectively. Further, the bottom surface of the fourth peripheral wall concave part 272 and the surface on the front side in the installation direction on the +Z side of the cartridge-side tape ejection port 261 are defined as a fourth pressing part 280 and a fifth pressing part 282, respectively. The fourth pressing part 280 and the fifth pressing part 282 are provided at positions corresponding to the fourth pressing protrusion 22 and the fifth pressing protrusion 23 provided on the installation-part cover 5, respectively.

When the installation-part cover 5 is closed in a state in which the ribbon cartridge 201 is installed in the cartridge installation part 7, the first pressing protrusion 19, the second pressing protrusion 20, and the third pressing protrusion 21 provided on the installation-part cover 5 are guided by the first peripheral wall concave part 267, the second peripheral wall concave part 269, and the third peripheral wall concave part 271, respectively, and butted against the first pressing part 275, the second pressing part 277, and the third pressing part 279, respectively. That is, the peripheries of the second paying-out core 206 and the second winding core 207 are pressed by the first pressing protrusion 19, the second pressing protrusion 20, and the third pressing protrusion 21. Thus, the second paying-out core 206 and the second winding core 207 are prevented from being inclined with respect to the second paying-out shaft 45 and the second winding shaft 47 provided in the cartridge installation part 7, respectively. Accordingly, it is possible to prevent the second ink ribbon 205 from becoming wrinkled when the second ink ribbon 205 is fed from the second paying-out core 206 to the second winding core 207.

Note that the ribbon cartridge 201 is allowed to accommodate an ink ribbon having a large ink ribbon width, for example, an ink ribbon having a width of 50 mm. Meanwhile, in order to accommodate an ink ribbon having an ink ribbon width smaller than 50 mm, for example, an ink ribbon having a width of 24 mm or less, the ribbon cartridge 201 may be one in which the ribbon-part front-side case 233 and the tape-retention-part front-side case 235 are reduced in dimension in the Z direction. At this time, both or any one of the first pressing protrusion 19 and the third pressing protrusion 21 may press the ribbon-part front-side wall part 239 without the provision of both or any one of the first peripheral wall concave part 267 and the third peripheral wall concave part 271.

Further, when the installation-part cover 5 is closed in a state in which the ribbon cartridge 201 is installed in the cartridge installation part 7, the fourth pressing protrusion 22 provided on the installation-part cover 5 is guided by the fourth peripheral wall concave part 272 and butted against the fourth pressing part 280. Thus, the fourth pressing part 280 is pressed to the back side in the installation direction by the fourth pressing protrusion 22 to allow a second electrode part 330 of a second circuit substrate 327 provided in the vicinity of the fourth pressing part 280 to properly come in contact with contact terminal parts 83. Further, when the installation-part cover 5 is closed in a state in which the ribbon cartridge 201 is installed in the cartridge installation part 7, the fifth pressing protrusion 23 provided on the installation-part cover 5 is butted against the fifth pressing part 282. Thus, the fifth pressing part 282 is pressed to the back side in the installation direction by the fifth pressing protrusion 23 to allow the second platen roller 203 provided in the vicinity of the fifth pressing part 282 to properly face the printing head 55. Note that the fifth pressing part 282 is positioned in the vicinity of the second platen roller 203 and the printing head 55. Therefore, a load is not preferably applied by the fifth pressing protrusion 23 when the tape printing device 1 performs a printing operation. In view of this, a gap may be formed between the fifth pressing protrusion 23 and the fifth pressing part 282 after the ribbon cartridge 201 is installed in the cartridge installation part 7.

In the ribbon-part back-side peripheral wall part 249, the ribbon-side first peripheral wall part 215 has a ribbon-side first hook engagement part 321, a ribbon-side second peripheral wall part 217 has a ribbon-side second hook engagement part 323, and the ribbon-side third peripheral wall part 219 has a ribbon-side third hook engagement part 325. In a state in which the ribbon cartridge 201 is installed in the cartridge installation part 7, the ribbon-side first hook engagement part 321, the ribbon-side second hook engagement part 323, and the ribbon-side third hook engagement part 325 provided in the ribbon cartridge 201 engage the first hook 57, the third hook 61, and the fourth hook 63 provided in the cartridge installation part 7, respectively. Thus, the ribbon cartridge 201 is prevented from being installed in a state of floating from the installation bottom surface 37.

Further, the second circuit substrate 327 is attached to the ribbon-side fifth peripheral wall part 225 in the ribbon-part back-side peripheral wall part 249. That is, the second circuit substrate 327 is attached to the ribbon-side fifth peripheral wall part 225 provided to be substantially parallel to the ribbon-side first peripheral wall part 215 having the cartridge-side tape ejection port 261. The ribbon-side fifth peripheral wall part 225 has a second substrate attachment part 337 to which the second circuit substrate 327 is attached.

As described above, the ribbon-side fifth peripheral wall part 225 is, when seen from the front side in the installation direction, bent with the internal angle $\alpha$ exceeding 180° with respect to the ribbon-side fourth peripheral wall part 223. Therefore, when the ribbon cartridge 201 falls down onto a floor or the like, the first curvature surface 221 between the ribbon-side third peripheral wall part 219 and the ribbon-side fourth peripheral wall part 223 or a corner part at which the ribbon-side fifth peripheral wall part 225 and the ribbon-side sixth peripheral wall part 227 cross each other are butted against the floor or the like, while the ribbon-side fourth peripheral wall part 223 and the ribbon-side fifth peripheral wall part 225 are prevented from being butted against the floor or the like. Accordingly, when the ribbon cartridge 201 falls down onto a floor or the like, the second electrode part 330 provided on the second circuit substrate 327 is prevented from being butted against the floor or the like. As a result, it is possible to prevent the second electrode part 330 having weak mechanical strength from being damaged. Note that the same function and effect are obtainable even with a configuration in which the second circuit substrate 327 is attached to the ribbon-side fourth peripheral wall part 223.

Figure 8:
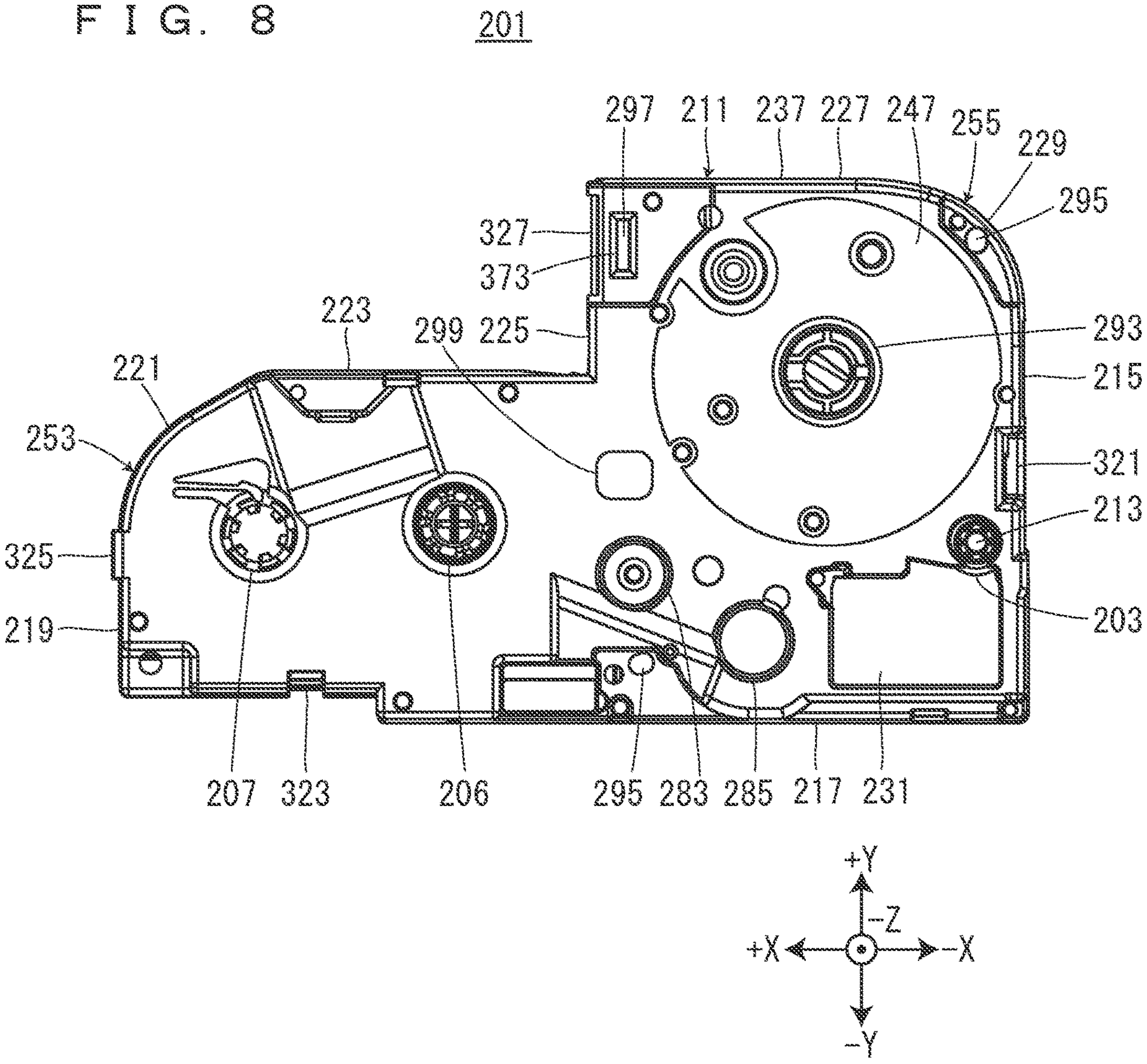
FIG. 8 is a view of the ribbon cartridge when seen from a back side in the installation direction.

As shown in FIG. 8, the second back wall part 247 has a hook insertion hole 299 formed on the +Y side of a paying-out-side cylindrical part 283. In a state in which the ribbon cartridge 201 is installed in the cartridge installation part 7, the second hook 59 provided in the cartridge installation part 7 is inserted into the hook insertion hole 299 provided on the ribbon cartridge 201. Thus, the second hook 59 is prevented from interfering with the ribbon cartridge 201 when the ribbon cartridge 201 is installed in the cartridge installation part 7.

Figure 9:
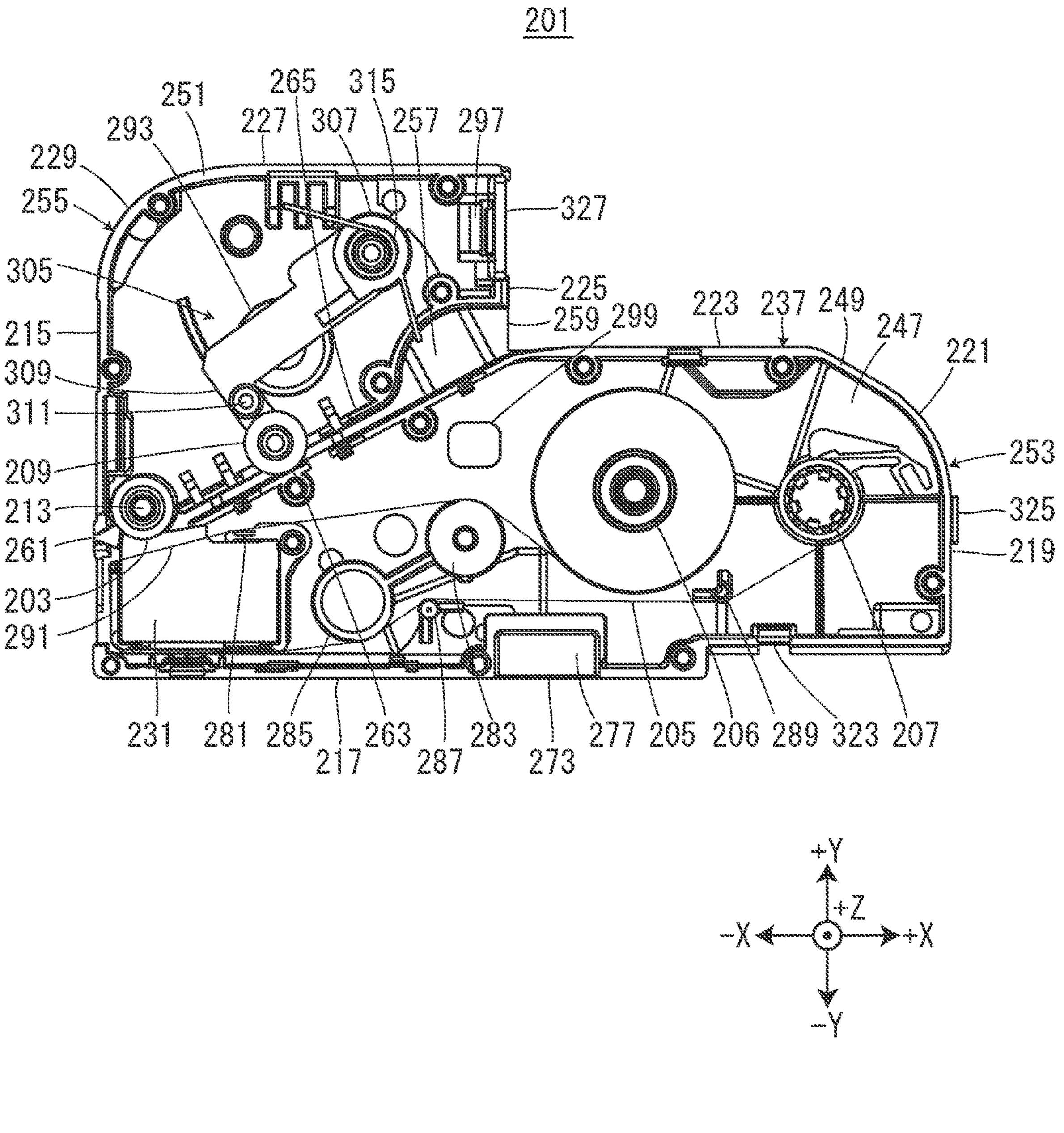
FIG. 9 is a view of the ribbon cartridge with a ribbon-part front-side case and a tape-retention-part front-side case removed therefrom when seen from the front side in the installation direction.

A second tape path 257 will be described on the basis of FIGS. 6, 7, and 9. The second tape path 257 is provided between the ribbon-part front-side case 233 and the tape-retention-part front-side case 235. The second tape path 257 connects a cartridge-side tape introduction port 259 provided on the ribbon-side fifth peripheral wall part 225 and the cartridge-side tape ejection port 261 provided on the ribbon-side first peripheral wall part 215 to each other. Note that the cartridge-side tape introduction port 259 is provided between the ink ribbon accommodation part 253 and the second circuit substrate 327. That is, the cartridge-side tape introduction port 259 is positioned on a side closer to the ribbon-side fourth peripheral wall part 223 than the second circuit substrate 327. In FIGS. 6 and 9, the cartridge-side tape introduction port 259 is provided at a region crossing the ribbon-side fourth peripheral wall part 223 at a distance from the second circuit substrate 327 of the ribbon-side fifth peripheral wall part 225. The cartridge-side tape introduction port 259 may be provided on the ribbon-side fourth peripheral wall part 223. In this case, in order to make a simple arrangement structure, the cartridge-side tape introduction port 259 is preferably close to a region crossing the ribbon-side fifth peripheral wall part 225 and the ribbon-side fourth peripheral wall part 223.

The cartridge-side tape introduction port 259 introduces the second printing tape 403 that has been introduced from the device-side tape introduction port 9 into the second cartridge case 211 in a state in which the ribbon cartridge 201 is installed in the cartridge installation part 7. The cartridge-side tape ejection port 261 ejects the second printing tape 403 to the outside of the second cartridge case 211 toward the device-side tape ejection port 11 in a state in which the ribbon cartridge 201 is installed in the cartridge installation part 7. The cartridge-side tape introduction port 259 and the cartridge-side tape ejection port 261 are formed into a slit shape along the installation direction. Therefore, the second printing tape 403 that has been introduced into the second cartridge case 211 is fed with its width direction substantially parallel to the installation direction.

In the lateral wall part of the second tape path 257, the lateral wall part on the side of the ink ribbon accommodation part 253 and the lateral wall part on the side of the tape-retention-mechanism accommodation part 255 are defined as a ribbon-side path lateral wall part 263 and a tape-retention-mechanism-side path lateral wall part 265, respectively. In the vicinity of the cartridge-side tape introduction port 259, the width of the second tape path 257, i.e., the interval between the ribbon-side path lateral wall part 263 and the tape-retention-mechanism-side path lateral wall part 265 is increased so that the second printing tape 403 is smoothly introduced.

On the second tape path 257, the second platen roller 203 and the retention tip end 209 are provided in an order close to the cartridge-side tape ejection port 261. In the tape-retention-mechanism-side path lateral wall part 265, a portion corresponding to the retention tip end 209 is notched so that the retention tip end 209 is capable of retaining the second printing tape 403 that has been introduced into the second tape path 257 between the retention tip end 209 and the ribbon-side path lateral wall part 263. Further, the end on the side of the cartridge-side tape ejection port 261 of the second tape path 257 is connected to the second head insertion hole 231 via a second ribbon exposure part 291 that will be described later.

The second back-side case 237 will be described on the basis of FIG. 9. The second back-side case 237 has, on the second back wall part 247, a second head peripheral edge convex part 281, a paying-out-side cylindrical part 283, a winding-side cylindrical part 285, a first ribbon guide 287, and a second ribbon guide 289 provided to protrude to the front side in the installation direction. The second head peripheral edge convex part 281 is provided at the peripheral edge part of the second head insertion hole 231. The second head peripheral edge convex part 281 is notched on the +Y side, i.e., at its part on the side of the second platen roller 203, and the notched portion serves as the second ribbon exposure part 291 at which the second ink ribbon 205 is exposed. Thus, in a state in which the ribbon cartridge 201 is installed in the cartridge installation part 7, the printing head 55 inserted into the second head insertion hole 231 faces the second platen roller 203 across the second ink ribbon 205 and the second printing tape 403.

The paying-out-side cylindrical part 283 and the winding-side cylindrical part 285 are, when seen from the front side in the installation direction, provided at positions corresponding to the first paying-out shaft 41 and the first winding shaft 43 provided in the cartridge installation part 7, respectively. In a state in which the ribbon cartridge 201 is installed in the cartridge installation part 7, the first paying-out shaft 41 and the first winding shaft 43 provided in the cartridge installation part 7 are inserted into the paying-out-side cylindrical part 283 and the winding-side cylindrical part 285 provided in the ribbon cartridge 201, respectively. Thus, the first paying-out shaft 41 and the first winding shaft 43 are prevented from interfering with the ribbon cartridge 201 when the ribbon cartridge 201 is installed in the cartridge installation part 7.

The second ink ribbon 205 that has been paid out from the second paying-out core 206 is wound up by the second winding core 207, while being guided by the paying-out-side cylindrical part 283, the second head peripheral edge convex part 281, the winding-side cylindrical part 285, the first ribbon guide 287, and the second ribbon guide 289 in this order. That is, the paying-out-side cylindrical part 283 and the winding-side cylindrical part 285 function as guide members that guide the second ink ribbon 205, besides receiving the first paying-out shaft 41 and the first winding shaft 43.

Further, the second back wall part 247 has a second cylindrical shaft part 293 provided to protrude to the front side in the installation direction. The second cylindrical shaft part 293 is formed into a substantially-stepped cylindrical shape. In a state in which the ribbon cartridge 201 is installed in the cartridge installation part 7, the insertion convex part 53 provided in the cartridge installation part 7 is inserted into the second cylindrical shaft part 293 provided in the ribbon cartridge 201.

The second back wall part 247 has a plurality of second positioning holes 295 provided on its surface on the back side in the installation direction. In a state in which the ribbon cartridge 201 is installed in the cartridge installation part 7, the second positioning holes 295 provided on the ribbon cartridge 201 engage the positioning pins 65 provided in the cartridge installation part 7. Thus, the ribbon cartridge 201 is positioned with respect to the cartridge installation part 7.

The second back wall part 247 has a second convex-part reception part 297 at a corner part at which the ribbon-side fifth peripheral wall part 225 and the ribbon-side sixth peripheral wall part 227 cross each other. In a state in which the ribbon cartridge 201 is installed in the cartridge installation part 7, the second convex-part reception part 297 provided in the ribbon cartridge 201 receives the engagement convex part 51 provided in the cartridge installation part 7.

In the tape-retention-mechanism accommodation part 255, the tape retention part 305 including the retention tip end 209 is accommodated. The tape retention part 305 is used to retain the second printing tape 403 that has been introduced into the second tape path 257 in advance when the ribbon cartridge 201 is installed in the cartridge installation part 7.

Figure 6:
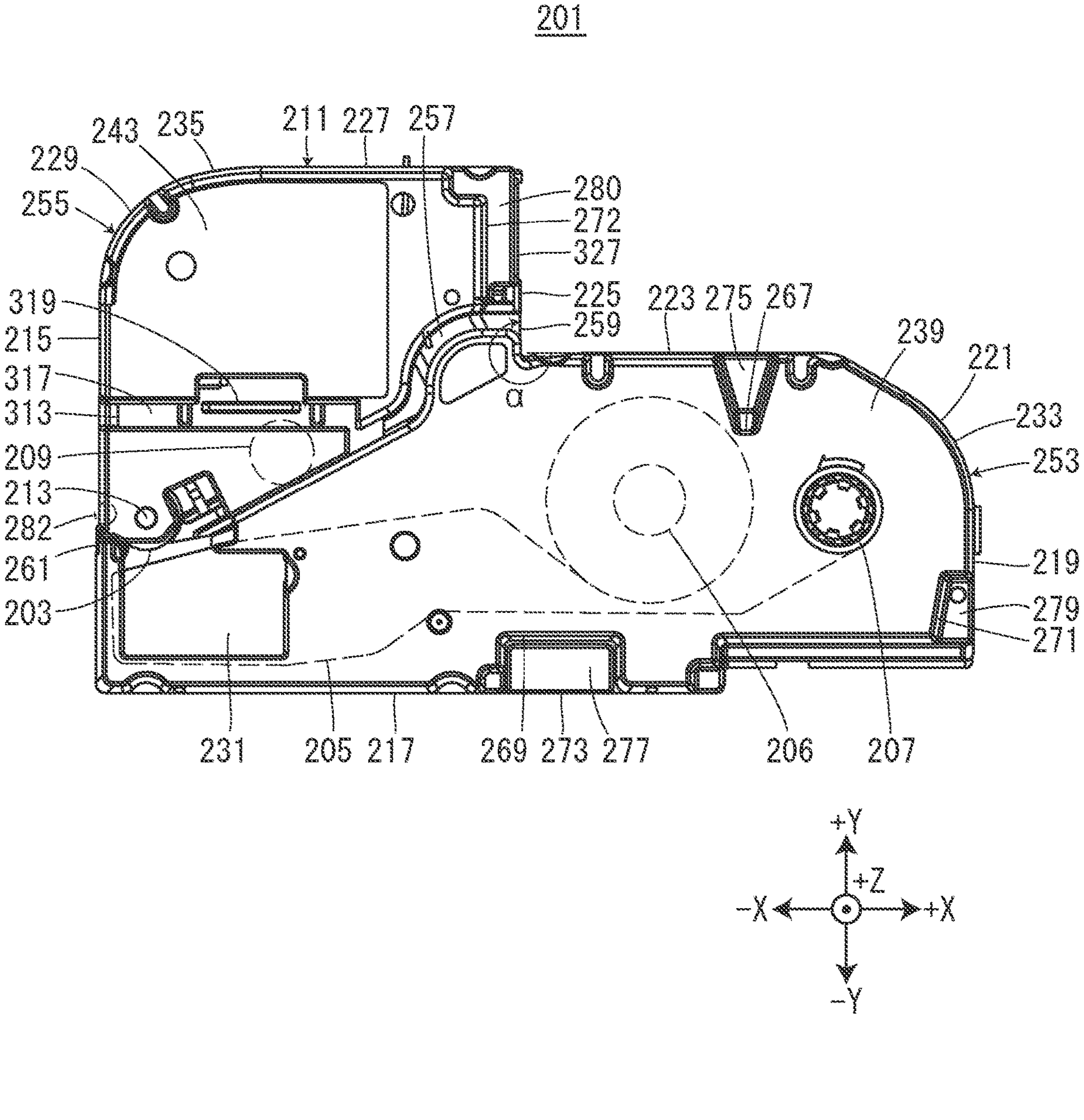
FIG. 6 is a view of the ribbon cartridge when seen from the front side in the installation direction.
Figure 7:
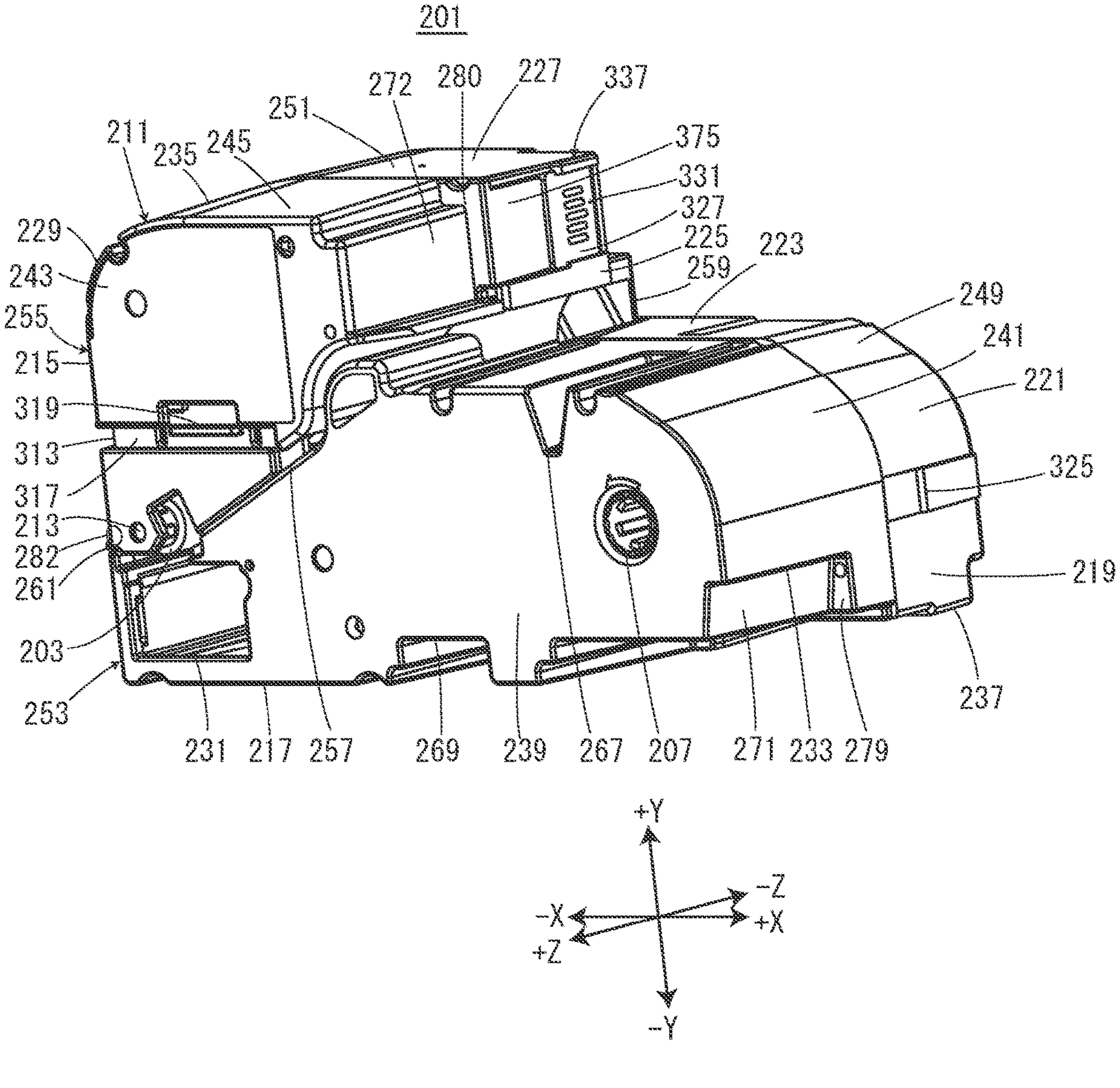
FIG. 7 is a perspective view of the ribbon cartridge.

As shown in FIGS. 6 and 9, the tape retention part 305 includes the retention tip end 209, an arm supporting shaft 307, an arm part 309, an engagement pin 311, and a slide plate 313. The retention tip end 209 is provided at one end of the arm part 309. The retention tip end 209 retains the second printing tape 403 that has been introduced into the second tape path 257 between the retention tip end 209 and the ribbon-side path lateral wall part 263. By retaining the second printing tape 403 with the retention tip end 209, it is possible to prevent the second printing tape 403 that has been introduced into the second tape path 257 from being pulled out from the second tape path 257 and reduce friction resistance applied to the second printing tape 403 when the second printing tape 403 is fed in the second tape path 257.

The arm supporting shaft 307 protrudes to the front side in the installation direction from the second back wall part 247. The arm part 309 is formed into a substantially "L"-shape when seen from the front side in the installation direction. The arm supporting shaft 307 is inserted at an end on a side opposite to an end at which the retention tip end 209 of the arm part 309 is provided. The arm part 309 is supported to be rotatable with respect to the arm supporting shaft 307. That is, the arm part 309 is provided to be rotatable between a close position at which the retention tip end 209 provided at the arm part 309 comes close to the ribbon-side path lateral wall part 263 and retains the second printing tape 403 that has been introduced into the second tape path 257 between the arm part 309 and ribbon-side path lateral wall part 263 and a separate position at which the retention tip end 209 provided at the arm part 309 separates from the ribbon-side path lateral wall part 263. Further, the arm supporting shaft 307 has the tape retention spring 315. The tape retention spring 315 applies a force to the arm part 309 toward the close position. Note that a torsion coil spring is, for example, available as the tape retention spring 315. The engagement pin 311 is provided between the end at which the retention tip end 209 of the arm part 309 is provided and the bending part of the arm part 309. The engagement pin 311 protrudes to the front side in the installation direction from the arm part 309.

The slide plate 313 is configured to be slidable in the Y direction with respect to the tape-retention-part front-side wall part 243. The slide plate 313 includes a plate body 317 and a picking-up part 319. The plate body 317 is provided to be substantially parallel to the tape-retention-part front-side wall part 243 on the inside, i.e., the −Z side of the tape-retention-part front-side wall part 243. The plate body 317 engages the tip end of the engagement pin 311. That is, the plate body 317 is connected to the arm part 309 via the engagement pin 311. Further, the plate body 317 engages the second platen roller 203. The picking-up part 319 protrudes to the front side in the installation direction from the plate body 317, and is formed into a substantially rectangular shape long in the X direction when seen from the front side in the installation direction. Note that the slide plate 313 is a resin-molded article having translucency like the tape-retention-part front-side case 235, but the material and manufacturing method of the slide plate 313 are not limited to those described above.

When a user picks up the picking-up part 319 and slides the slide plate 313 to a non-retention position on the +Y side, the arm part 309 connected to the plate body 317 via the engagement pin 311 rotates to the separate position against the tape retention spring 315 and the tip end on the +Z side of the second platen roller 203 moves to the +Y side. In other words, when the slide plate 313 is caused to slide to the non-retention position on the +Y side, the second platen roller 203 is inclined in a direction in which the tip end on the +Z side separates from the second ribbon exposure part 291. Thus, the retention tip end 209 provided at the arm part 309 separates from the ribbon-side path lateral wall part 263, and the second platen roller 203 separates from the second ink ribbon 205 exposed at the second ribbon exposure part 291.

On the other hand, when the user slides the slide plate 313 to a retention position on the −Y side, the arm part 309 rotates to the close position and the tip end on the +Z side of the second platen roller 203 moves to the −Y side. Thus, the retention tip end 209 retains the second printing tape 403 between the retention tip end 209 and the ribbon-side path lateral wall part 263, and the second platen roller 203 comes close to the second ink ribbon 205 exposed at the second ribbon exposure part 291.

By the provision of the tape retention part 305 thus configured, the second printing tape 403 that has been introduced into the second tape path 257 in advance is prevented from being pulled out from the second tape path 257 when the ribbon cartridge 201 is installed in the cartridge installation part 7. Therefore, the user is allowed to simultaneously set the second printing tape 403 and the ribbon cartridge 201 in the tape printing device 1 by the simple operation of installing the ribbon cartridge 201 in which the second printing tape 403 has been introduced into the second tape path 257 in advance in the cartridge installation part 7. That is, the user has no need to separately perform the operation of installing the ribbon cartridge 201 in the cartridge installation part 7 and the operation of introducing the second printing tape 403 into the cartridge installation part 7.

When the second printing tape 403 has not been introduced into the second tape path 257 of the ribbon cartridge 201, the user introduces the second printing tape 403 into the second tape path 257 before installing the ribbon cartridge 201 in the cartridge installation part 7. That is, by sliding the slide plate 313 to the non-retention position, the user causes the retention tip end 209 to separate from the ribbon-side path lateral wall part 263 and the second platen roller 203 to separate from the second ink ribbon 205. In this state, the user introduces the second printing tape 403 into the second tape path 257 from the cartridge-side tape introduction port 259 or the front side in the installation direction of the opened second tape path 257 so as to make the second printing tape 403 pass between the second platen roller 203 and the second ink ribbon 205. Subsequently, the user slides the slide plate 313 to the retention position to cause the retention tip end 209 to come close to the ribbon-side path lateral wall part 263 and cause the second platen roller 203 to come close to the second ink ribbon 205. Thus, the second printing tape 403 that has been introduced into the second tape path 257 is retained by the retention tip end 209.

Note that the platen shaft 39 is inserted into the platen shaft insertion hole 213 in a state in which the ribbon cartridge 201 is installed in the cartridge installation part 7. Therefore, the slide plate 313 engaging the second platen roller 203 is not allowed to slide from the retention position to the non-retention position. Thus, the cancellation of the retention state of the second printing tape 403 and the pulling of the second printing tape 403 out from the second tape path 257 caused when the user falsely slides the slide plate 313 to the non-retention position in a state in which the ribbon cartridge 201 is installed in the cartridge installation part 7 are prevented.

[Printing Processing Performed when Ribbon Cartridge is Installed]

Printing processing performed by the tape printing device 1 in a state in which the ribbon cartridge 201 is installed in the cartridge installation part 7 will be described on the basis of FIG. 10. In a state in which the ribbon cartridge 201 is installed in the cartridge installation part 7, the platen shaft 39, the second paying-out shaft 45, and the second winding shaft 47 provided in the cartridge installation part 7 are inserted into the second platen shaft insertion hole 213 of the second platen roller 203, the second paying-out core 206, and the second winding core 207 provided in the ribbon cartridge 201, respectively. Thus, the driving force of a feeding motor provided in the tape printing device 1 becomes transmissible to the second platen roller 203, the second paying-out core 206, and the second winding core 207.

Further, in a state in which the ribbon cartridge 201 is installed in the cartridge installation part 7, the head part 49 provided in the cartridge installation part 7 is inserted into the second head insertion hole 231 provided on the ribbon cartridge 201. When the installation-part cover 5 is closed after the installation of the ribbon cartridge 201 in the cartridge installation part 7, the printing head 55 is caused to move to the platen shaft 39 by a head movement mechanism. Thus, the second printing tape 403 and the second ink ribbon 205 are sandwiched between the printing head 55 and the second platen roller 203. Note that a portion at which the second platen roller 203 sandwiches the second printing tape 403 and the second ink ribbon 205 between the second platen roller 203 and the printing head 55 is defined as a second feeding portion 79.

When the feeding motor rotates in a normal direction in this state, the second platen roller 203 rotates in a normal direction and the second winding core 207 rotates in a winding direction. Thus, the second printing tape 403 that has been introduced from the device-side tape introduction port 9 is fed to the device-side tape ejection port 11, and the second ink ribbon 205 that has been paid out from the second paying-out core 206 is wound up by the second winding core 207.

Further, when the feeding motor rotates in a reverse direction, the second platen roller 203 rotates in a reverse direction and the second paying-out core 206 rotates in a rewinding direction. Thus, the second printing tape 403 that has been ejected from the cartridge-side tape ejection port 261 is returned to the inside of the second cartridge case 211, and the second ink ribbon 205 that has been paid out from the second paying-out core 206 is rewound by the second paying-out core 206. As described above, the second paying-out shaft 45 inserted into the second paying-out core 206 and the second winding shaft 47 inserted into the second winding core 207 constitute a second ink ribbon transportation mechanism that feeds the second ink ribbon 205.

By rotating the feeding motor in the normal direction and heating the printing head 55, the tape printing device 1 prints printing information input via the keyboard or the like on the second printing tape 403 while feeding the second printing tape 403 and the second ink ribbon 205. After the completion of the printing, the tape printing device 1 causes the cutter 17 to perform a cutting operation to cut off a printed portion of the second printing tape 403. Then, by rotating the feeding motor in the reverse direction, the tape printing device 1 returns the second printing tape 403 until the tip end of the second printing tape 403 comes to the vicinity of a position at which the tip end is sandwiched between the printing head 55 and the second platen roller 203. Thus, it is possible to reduce a margin to be created on the front side in the length direction of the second printing tape 403 that is to be next printed.

Here, a force applied by the second platen roller 203 to the second printing tape 403 at the second feeding portion 79 is defined as a second feeding force Fc. The direction of the second feeding force Fc, i.e., a direction in which the second printing tape 403 is fed at the second feeding portion 79 when the second printing tape 403 is fed toward the device-side tape ejection port 11 is defined as a second feeding direction. The second feeding direction is orthogonal to a direction in which the printing head 55 sandwiches the second printing tape 403 between the printing head 55 and the second platen roller 203. Further, a force acting on the ribbon cartridge 201 as the reaction force of the second feeding force Fc is defined as a second feeding reaction force Fd. The second feeding reaction force Fd increases when the feeding speed of the second printing tape 403 accelerates. On the other hand, since the tension of the second printing tape 403 disappears when the feeding speed of the second printing tape 403 decelerates, the second feeding reaction force Fd also disappears.

An angle formed by the second feeding direction with respect to a direction in which the second circuit substrate 327 receives a force from the contact terminal parts 83 of the substrate connection part 67, i.e., the −X direction when seen from the front side in the installation direction is defined as a second feeding angle θc. Note that an angle formed by the direction of the second tape path 257 at the second feeding portion 79 with respect to the direction in which the second circuit substrate 327 receives the force from the contact terminal parts 83 when seen from the front side in the installation direction is defined as a second path angle θd. The second path angle θd is approximately equal to the second feeding angle θc.

The second feeding angle θc and the second path angle θd are preferably less than 45°, and set at 25° or more and 30° or less in the present embodiment. The second feeding angle θc and the second path angle θd are less than 45°. Therefore, among the vector components of the second feeding reaction force Fd, a vector component Fdx in the X direction, i.e., a vector component in a direction in which the second circuit substrate 327 is pressed against the contact terminal parts 83 becomes larger than a vector component Fdy in the Y direction, i.e., a vector component in a direction in which the second circuit substrate 327 is shifted with respect to the contact terminal parts 83. Thus, it is possible to prevent the second circuit substrate 327 from being shifted in the Y direction with respect to the contact terminal parts 83. The second feeding angle θc may be replaced as an entering angle at which the second printing tape 403 enters the second platen roller 203. The second path angle θd may be set on the basis of any of the ribbon-side path lateral wall part 263 and the tape-retention-mechanism-side path lateral wall part 265 constituting the second tape path 257. Alternatively, the second path angle θd may be set on the basis of the center of the second tape path 257. Further, the second tape path 257 widens at the cartridge-side tape introduction port 259, but may be configured to gradually narrow from the cartridge-side tape introduction port 259 to the second platen roller 203.

Figure 10:
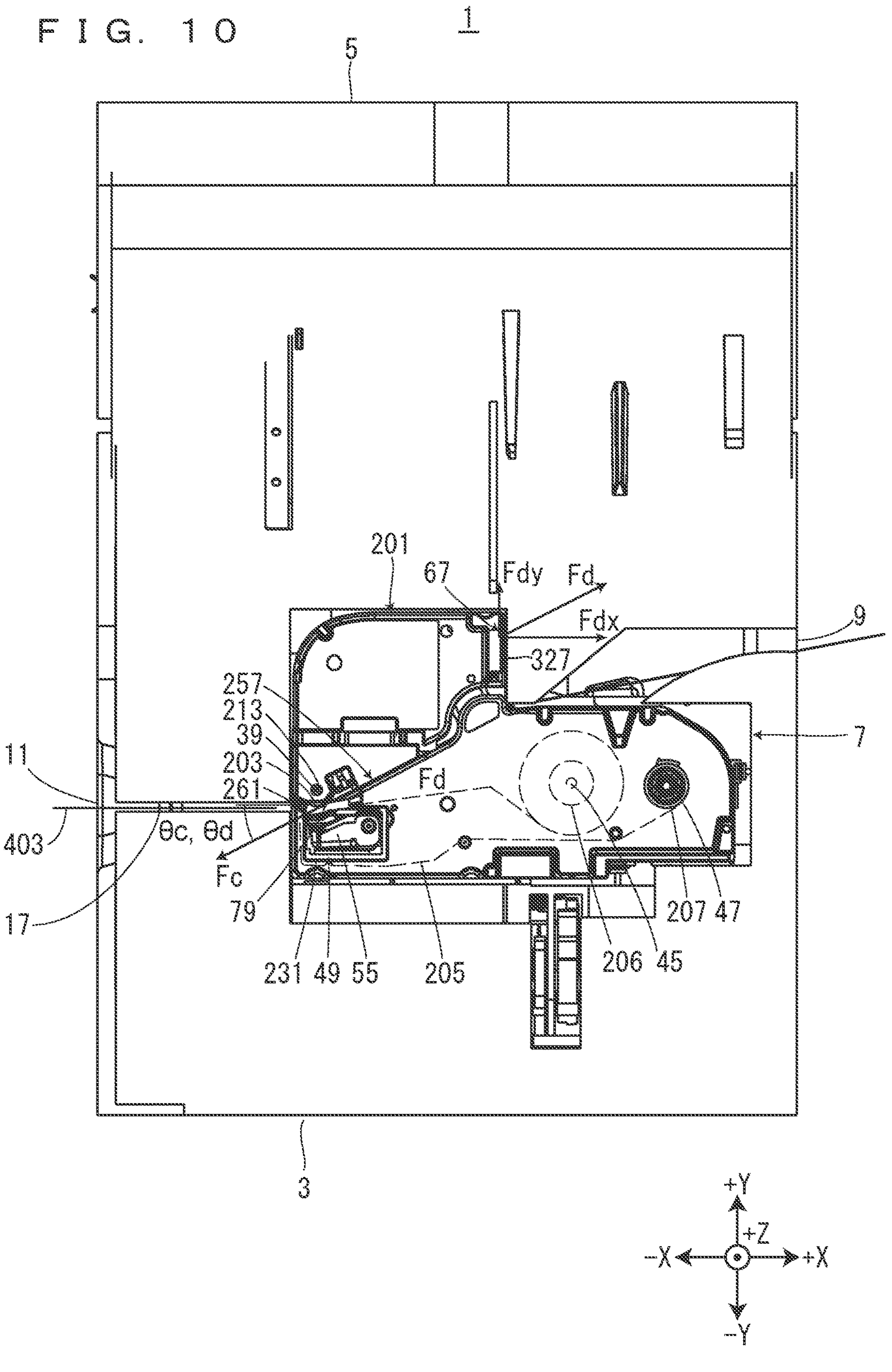
FIG. 10 is a view for describing printing processing performed by the tape printing device in a state in which the ribbon cartridge is installed in the cartridge installation part.

As shown in FIG. 10, when the tape printing device 1 performs printing processing in a state in which the ribbon cartridge 201 is installed in the cartridge installation part 7, the second printing tape 403 is introduced from the device-side tape introduction port 9 and ejected from the device-side tape ejection port 11 via the second tape path 257. That is, during the printing processing by the tape printing device 1, the second printing tape 403 is transported from the +X side to the −X side when seen from the front side in the installation direction. On the other hand, the direction of the force in which the second circuit substrate 327, more specifically, the ribbon cartridge 201 receives the force from the contact terminal parts 83 is a direction from the +X side to the −X side when seen from the front side in the installation direction. In other words, the transportation direction of the second printing tape 403 and the direction in which the ribbon cartridge 201 receives the force from the contact terminal parts 83 become the same.

[Substrate Connection Part]

Figure 11:
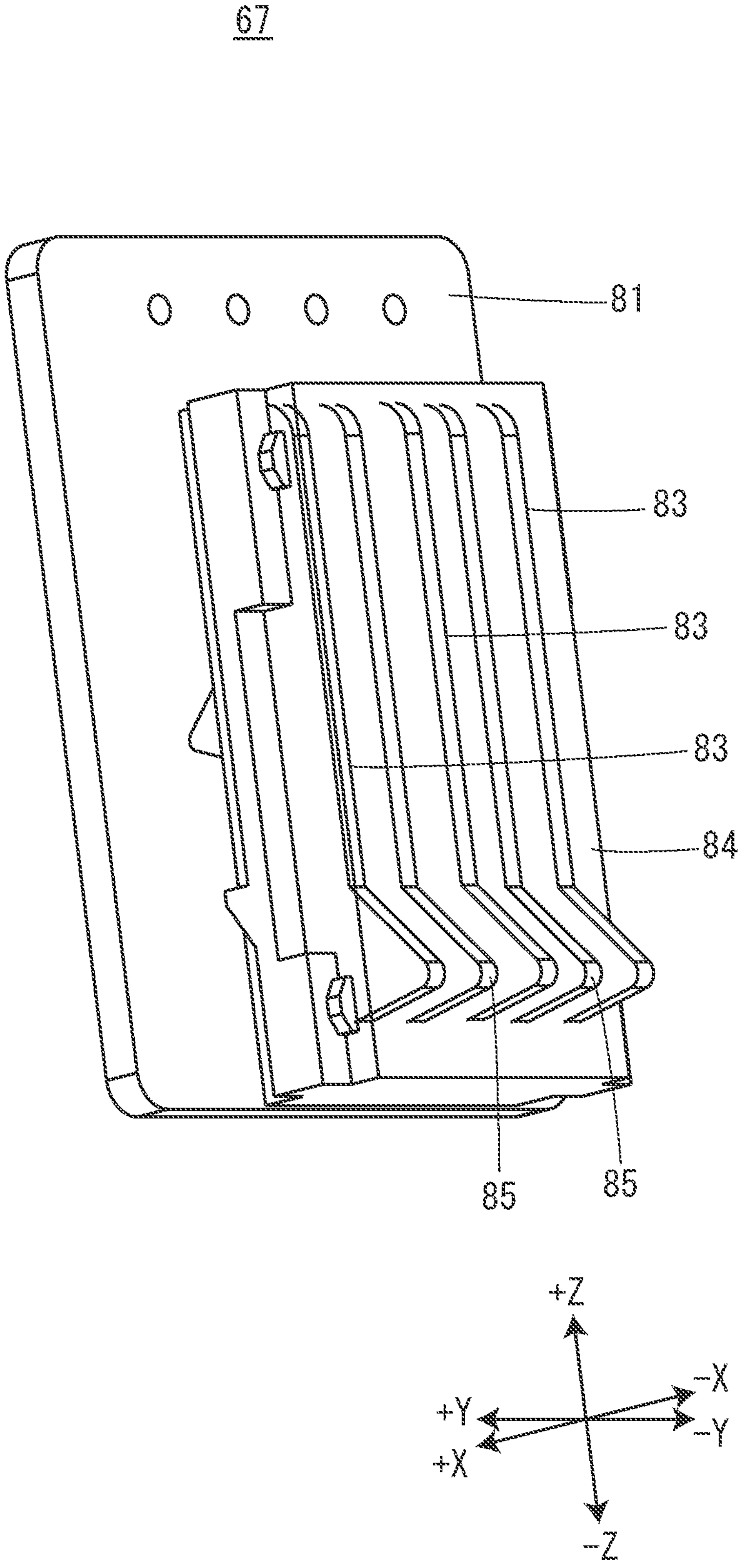
FIG. 11 is a perspective view of a substrate connection part.

The substrate connection part 67 will be described on the basis of FIGS. 11 to 13. The substrate connection part 67 includes a connection substrate 81, a plurality of contact terminal parts 83, and a terminal cover 84. The plurality of contact terminal parts 83 are arrayed to form a line in the Y direction. The contact terminal parts 83 are metal elastic members having a shape folded back and curved into a substantially "U"-shape. The contact terminal parts 83 have one end thereof connected to the connection substrate 81 and the other end thereof provided with a contact tip end 85 formed into a substantially right triangle shape having an acute angle on the −X side when seen from the −Y side. The contact terminal parts 83 protrude to the −X side from slit-shaped terminal openings (not shown) provided on the terminal cover 84 when not receiving an external force, and elastically displace to the +X direction when receiving the external force. Therefore, the contact terminal parts 83 press the first circuit substrate 165 or the second circuit substrate 327 to the −X side with a pressing force accompanied by the elastic displacement. A position at which the contact terminal parts 83 press the first circuit substrate 165 or the second circuit substrate 327, i.e., the position of the contact tip ends 85 may partially overlap the engagement convex part 51 in the installation direction.

Figure 12:
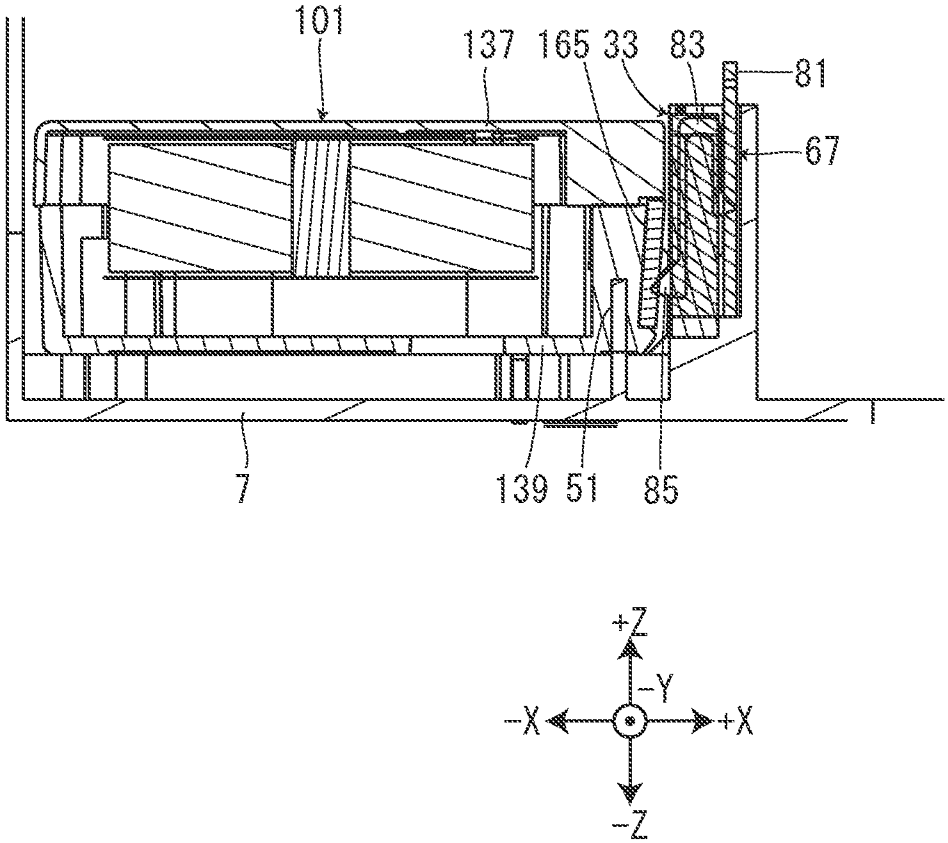
FIG. 12 is a cross-sectional view of the vicinity of the substrate connection part in a state in which the tape cartridge is installed in the cartridge installation part.

As shown in FIG. 12, the contact terminal parts 83 are provided at a position overlapping a first back-side case 139 having the first circuit substrate 165 in the installation direction in a state in which the tape cartridge 101 is installed in the cartridge installation part 7. Further, as shown in FIG. 13, the contact terminal parts 83 are provided at a position overlapping the second back-side case 237 having the second circuit substrate 327 in the installation direction in a state in which the ribbon cartridge 201 is installed in the cartridge installation part 7. Therefore, the contact terminal parts 83 come in contact with a first electrode part 169 (see FIG. 19) provided on the first circuit substrate 165 in a state in which the tape cartridge 101 is installed in the cartridge installation part 7, and come in contact with the second electrode part 330 provided on the second circuit substrate 327 in a state in which the ribbon cartridge 201 is installed in the cartridge installation part 7. At this time, the contact terminal parts 83 elastically displace in the +X direction by coming in contact with the first electrode part 169 or the second electrode part 330. FIG. 12 is a view emphasizing a state in which the contact terminal parts 83 are disposed at the position overlapping the first circuit substrate 165. Accordingly, it is possible to share the costly substrate connection part 67 between the tape cartridge 101 and the ribbon cartridge 201 and attain the cost reduction of the tape printing device 1.

[Second Circuit Substrate]

Figure 14:
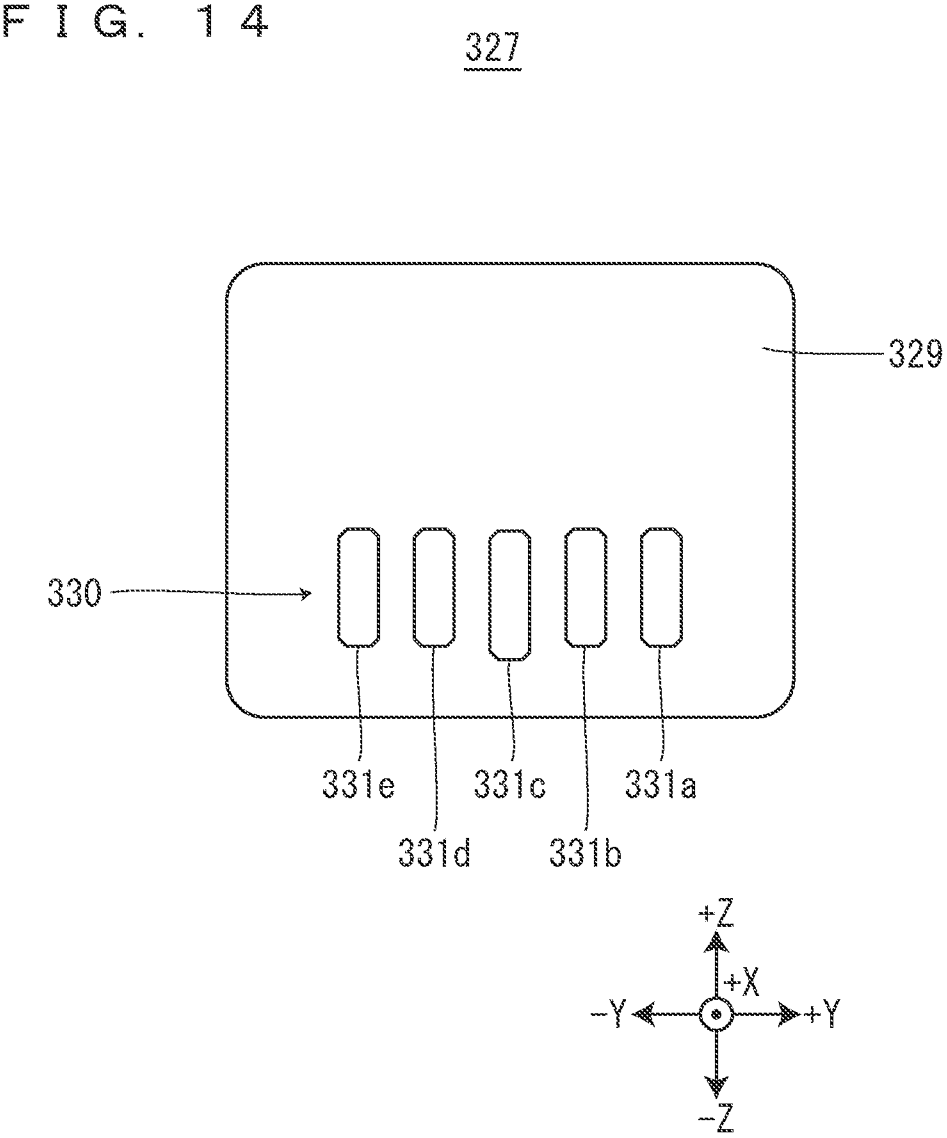
FIG. 14 is a view of a second circuit substrate when seen from a +X side.
Figure 15:
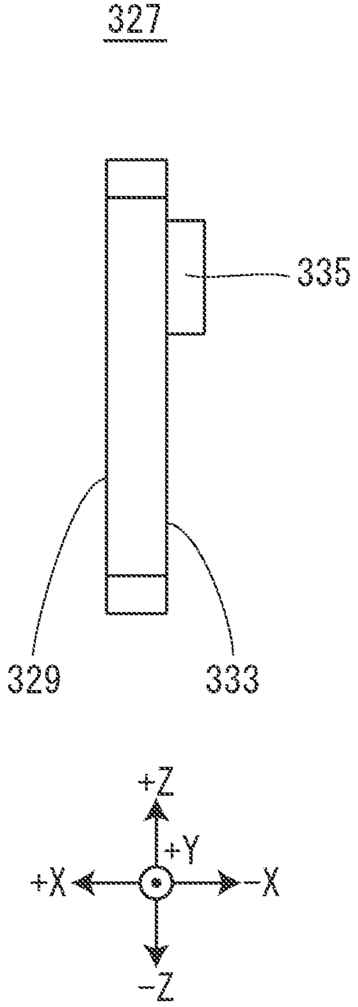
FIG. 15 is a view of the second circuit substrate when seen from a +Y side.

The second circuit substrate 327 will be described on the basis of FIGS. 14 and 15. Note that since the first circuit substrate 165 is configured like the second circuit substrate 327, its description will be omitted. The second circuit substrate 327 has the second electrode part 330 on its +X-side surface, i.e., a first surface 329 serving as its outside surface. The second electrode part 330 includes a plurality of second electrodes 331. The plurality of second electrodes 331 are arrayed to form a line in the Y direction. Therefore, unlike a configuration in which the plurality of second electrodes 331 are arrayed to form a plurality of lines, the pressing force of the contact terminal parts 83 does not fluctuate between the plurality of lines. As a result, it is possible to ensure the stability of the electric contact between the second electrodes 331 and the contact terminal parts 83.

The plurality of second electrodes 331 include a VCC electrode 331*a*, an A2 electrode 331*b*, a GND electrode 331*c*, an SCL electrode 331*d*, and an SDA electrode 331*e*. The VCC electrode 331*a* is an electrode for a power-supply voltage. The A2 electrode 331*b* is an electrode for setting a slave address. The GND electrode 331*c* is an electrode for a reference voltage. The SCL electrode 331*d* is an electrode for inputting a serial clock. The SDA electrode 331*e* is an electrode for inputting/outputting serial data. The GND electrode 331*c* arranged in the middle of the plurality of second electrodes 331 further extends to the back side in the installation direction than the other second electrodes 331. Meanwhile, the plurality of contact terminal parts 83 are arranged at the same position in the installation direction. Therefore, when the ribbon cartridge 201 is installed in the cartridge installation part 7, the GND electrode 331*c* among the plurality of second electrodes 331 initially comes in contact with the contact terminal parts 83. Further, when the ribbon cartridge 201 is removed from the cartridge installation part 7, the GND electrode 331*c* among the plurality of second electrodes 331 lastly separates from the contact terminal parts 83. Therefore, it is possible to improve the operation stability of a second electric element 335 that will be described later. Note that the number and arrangement order of the plurality of second electrodes 331 are not particularly limited but may be changed according to the specifications of the second electric element 335 that will be described later and a method for designing the second circuit substrate 327.

The second circuit substrate 327 has the second electric element 335 mounted on a second surface 333 that is a surface on a side opposite to the side of the first surface 329. The second electric element 335 is mounted on a side closer to the front side in the installation direction than the center in the installation direction of the second surface 333. The second electric element 335 is mounted on the second surface 333 that serves as the inside surface of the second circuit substrate 327. Therefore, when the ribbon cartridge 201 falls down onto a floor or the like, the second electric element 335 is prevented from being butted against the floor or the like. As a result, it is possible to prevent the second electric element 335 having weak mechanical strength from being damaged. Note that the second electric element 335 may be mounted on the first surface 329 rather than being mounted on the second surface 333 of the second circuit substrate 327. For example, the second electric element 335 is mountable on the front side in the installation direction of the second electrode part 330. Further, the second electric element 335 electrically connected to the second electrode part 330 may be provided on the ribbon-side fourth peripheral wall part 223 or the ribbon-side fifth peripheral wall part 225 besides being provided on the second circuit substrate 327.

The second electric element 335 is a memory element and stores information such as the width of the second ink ribbon 205 and the residual amount of the second ink ribbon 205 wound on the second paying-out core 206. As a mode for mounting the second electric element 335, an IC chip package, an IC chip, or the like is, for example, available. When an IC chip is used, the IC chip mounted on the second circuit substrate 327 is preferably coated with a resin. Thus, since the fixation of a mounting portion by a coating resin is allowed besides a reduction in mounting height, it is possible to improve shock resistance.

[Second Substrate Attachment Part]

Figure 16:
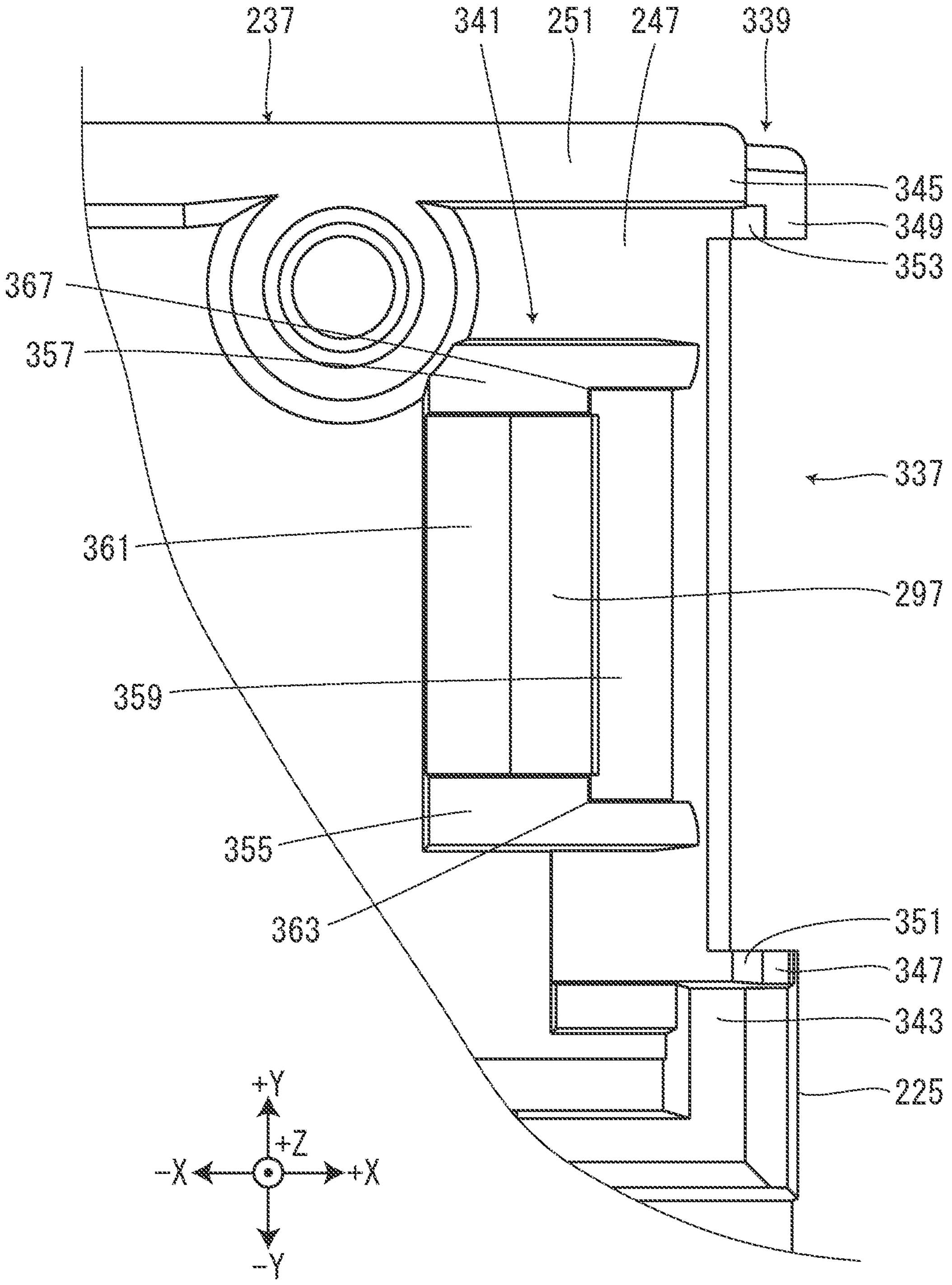
FIG. 16 is a partially-enlarged view of the vicinity of a second substrate attachment part when seen from the front side in the installation direction.
Figure 17:
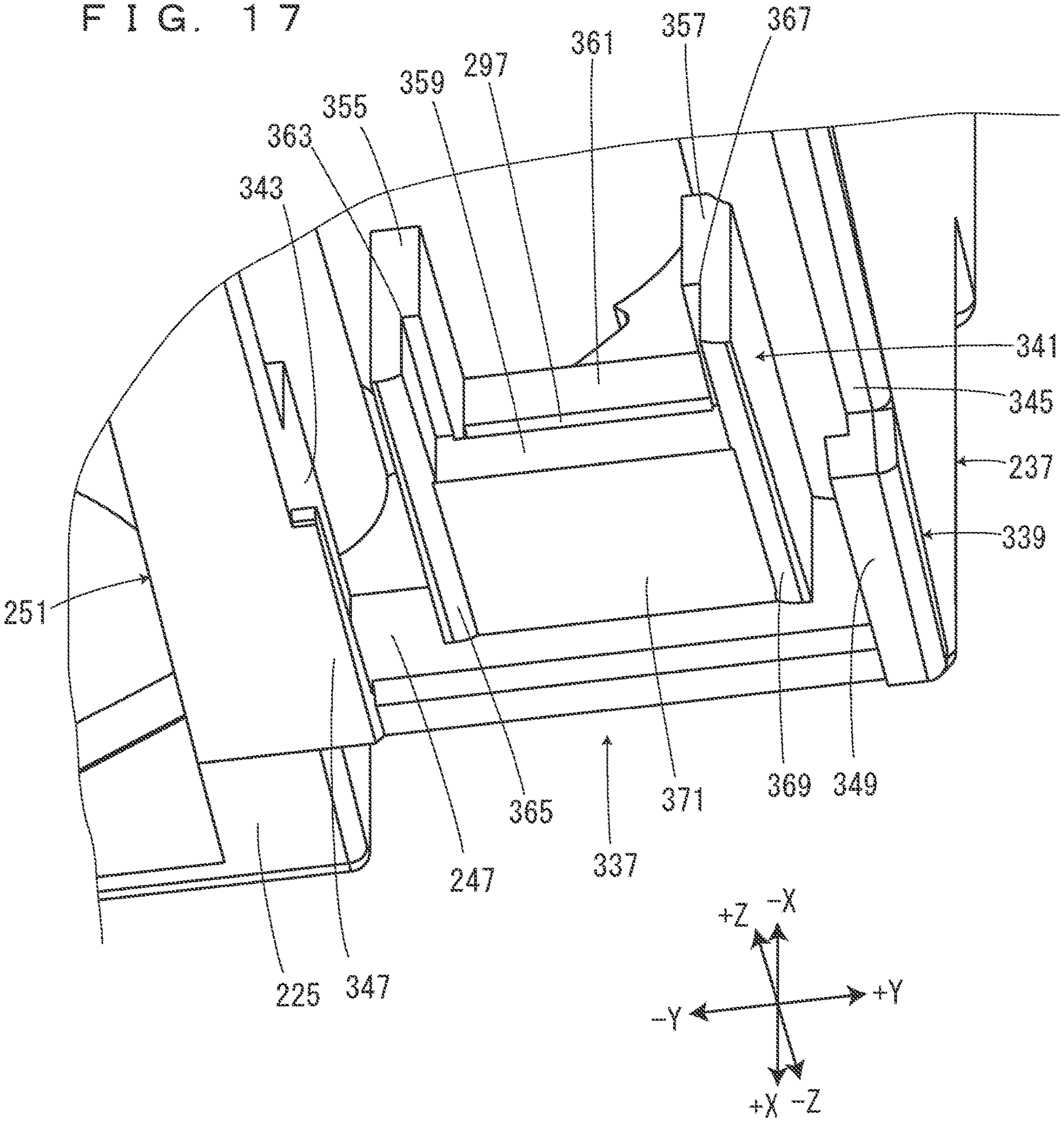
FIG. 17 is a partially-enlarged perspective view of the vicinity of the second substrate attachment part.

The second substrate attachment part 337 to which the second circuit substrate 327 is attached in the ribbon cartridge 201 will be described on the basis of FIGS. 16 and 17. Note that since the first substrate attachment part 167 to which the first circuit substrate 165 is attached in the tape cartridge 101 is configured like the second substrate attachment part 337, its description will be omitted. The second substrate attachment part 337 includes a peripheral wall attachment part 339 and a protrusion attachment part 341.

The peripheral wall attachment part 339 is formed in such a manner that a part of the ribbon-side fifth peripheral wall part 225 in the tape-retention-part back-side peripheral wall part 251 is notched. The peripheral wall attachment part 339 includes, with respect to the second circuit substrate 327, a first peripheral wall attachment wall part 343 positioned on the −Y side, a second peripheral wall attachment wall part 345 positioned on the +Y side, and a third peripheral wall attachment wall part 347 and a fourth peripheral wall attachment wall part 349 positioned on the +X side.

The interval between the first peripheral wall attachment wall part 343 and the second peripheral wall attachment wall part 345 is narrower toward the back side in the installation direction and approximately equal to the width, i.e., the dimension in the Y direction of the second circuit substrate 327. Therefore, the second circuit substrate 327 is attached to the second substrate attachment part 337 in a state of being positioned in the Y direction.

The third peripheral wall attachment wall part 347 protrudes to the +Y side from the end on the +X side of the first peripheral wall attachment wall part 343. The surface on the −X side of the third peripheral wall attachment wall part 347 is a third peripheral wall inclination surface 351 that is inclined so as to make the back side in the installation direction turned to the −X side with respect to a surface perpendicular to the second back wall part 247. The fourth peripheral wall attachment wall part 349 protrudes to the −Y side from the end on the +X side of the second peripheral wall attachment wall part 345. The surface on the −X side of the fourth peripheral wall attachment wall part 349 is a fourth peripheral wall inclination surface 353 that is inclined so as to make the back side in the installation direction turned to the −X side with respect to the surface perpendicular to the second back wall part 247.

The protrusion attachment part 341 is positioned on the −X side of the peripheral wall attachment part 339 and protrudes to the front side in the installation direction from the second back wall part 247. The protrusion attachment part 341 is formed into a substantially rectangular ring shape long in the Y direction when seen from the front side in the installation direction, and its hole-shaped portion serves as the second convex-part reception part 297. The protrusion attachment part 341 includes, with respect to the second convex-part reception part 297, a first protrusion attachment wall part 355 positioned on the −Y side, a second protrusion attachment wall part 357 positioned on the +Y side, a third protrusion attachment wall part 359 positioned on the +X side, and a fourth protrusion attachment wall part 361 positioned on the −X side. The protrusion amount of the first protrusion attachment wall part 355 to the front side in the installation direction and the protrusion amount of the second protrusion attachment wall part 357 to the front side in the installation direction are approximately the same. The first protrusion attachment wall part 355 and the second protrusion attachment wall part 357 have a larger protrusion amount to the front side in the installation direction than the third protrusion attachment wall part 359. The third protrusion attachment wall part 359 has a larger protrusion amount to the front side in the installation direction than the fourth protrusion attachment wall part 361.

The first protrusion attachment wall part 355 is formed into a substantially rectangular shape long in the X direction when seen from the front side in the installation direction. The first protrusion attachment wall part 355 has, on its +Y-side surface, a first step part 363 connected to the end on the −Y side of the third protrusion attachment wall part 359. The surface on the +X side of the first protrusion attachment wall part 355 is a first protrusion inclination surface 365 that is inclined so as to make the back side in the installation direction turned to the −X side with respect to the surface perpendicular to the second back wall part 247. The second protrusion attachment wall part 357 is formed into a substantially rectangular shape long in the X direction when seen from the front side in the installation direction. The second protrusion attachment wall part 357 has, on its −Y-side surface, a second step part 367 connected to the end on the +Y side of the third protrusion attachment wall part 359. The surface on the +X side of the second protrusion attachment wall part 357 is a second protrusion inclination surface 369 that is inclined so as to make the back side in the installation direction turned to the −X side with respect to the surface perpendicular to the second back wall part 247.

The third protrusion attachment wall part 359 is formed into a substantially rectangular shape long in the Y direction when seen from the front side in the installation direction. The third protrusion attachment wall part 359 is provided between the end on the +X side of the first protrusion attachment wall part 355 and the end on the +X side of the second protrusion attachment wall part 357. The surface on the +X side of the third protrusion attachment wall part 359 is a third protrusion inclination surface 371 that is inclined so as to make the back side in the installation direction turned to the −X side with respect to the surface perpendicular to the second back wall part 247. The fourth protrusion attachment wall part 361 is formed into a substantially rectangular shape long in the Y direction when seen from the front side in the installation direction. The fourth protrusion attachment wall part 361 is provided between the end on the −X side of the first protrusion attachment wall part 355 and the end on the −X side of the second protrusion attachment wall part 357.

Figure 13:
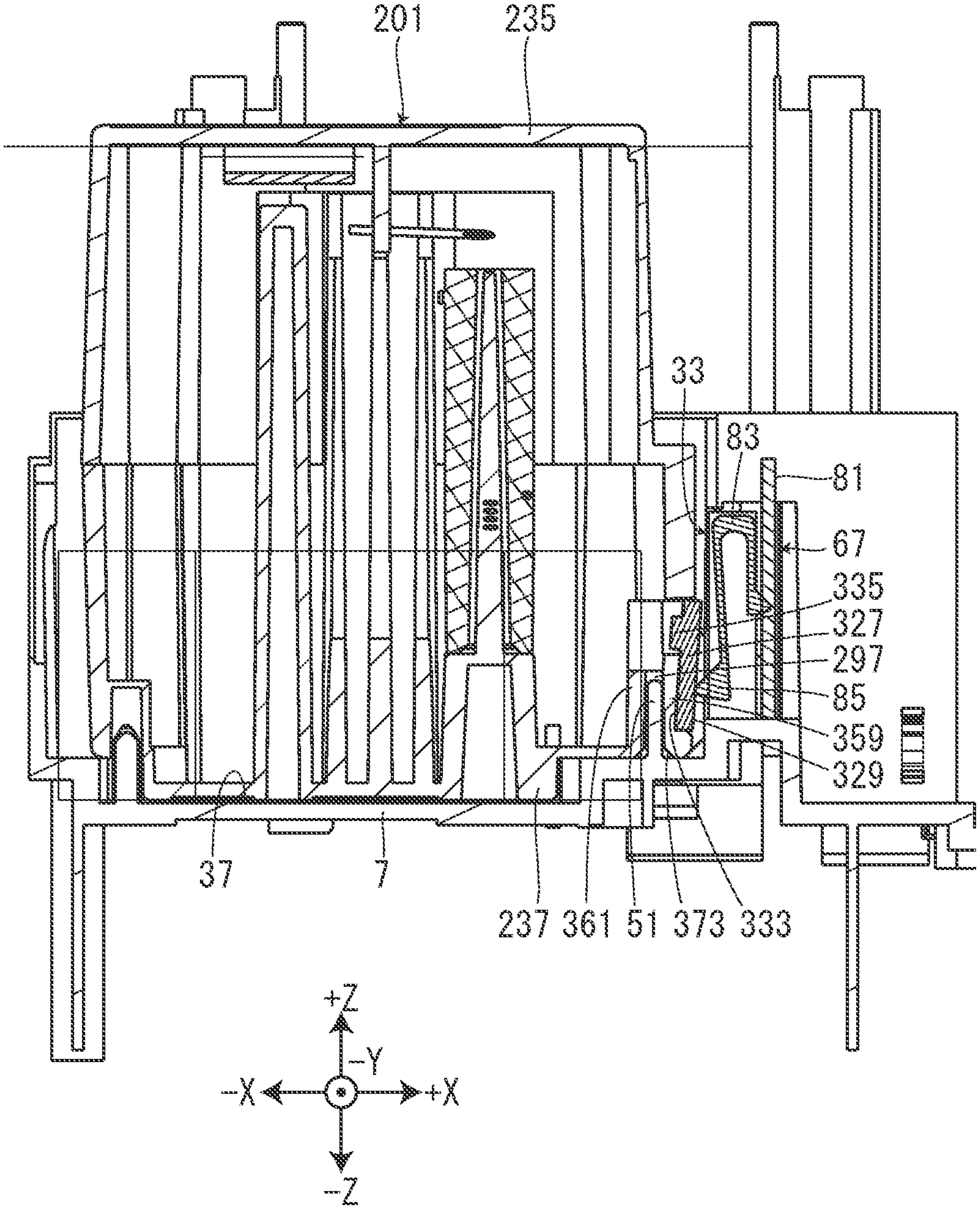
FIG. 13 is a cross-sectional view of the vicinity of the substrate connection part in a state in which the ribbon cartridge is installed in the cartridge installation part.

Note that the second electric element 335 is provided at a position at which the second electric element 335 does not interfere with the third protrusion attachment wall part 359 (see FIG. 13). Therefore, the second surface 333 of the second circuit substrate 327 on which the second electric element 335 is provided is allowed to come in contact with the third protrusion attachment wall part 359. Further, the second electric element 335 is arranged at a position closer to the front side in the installation direction than a position pressed by the contact terminal parts 83. Therefore, the pressing force of the contact terminal parts 83 is prevented from directly acting on the second electric element 335. As a result, it is possible to prevent the occurrence of an operation failure or an electrical contact failure in the second electric element 335.

With respect to the second substrate attachment part 337 thus configured, the second circuit substrate 327 is inserted between the peripheral wall attachment part 339 and the protrusion attachment part 341 from the front side in the installation direction before the tape-retention-part front-side case 235 and the second back-side case 237 are combined together. Subsequently, when the tape-retention-part front-side case 235 and the second back-side case 237 are combined together, the second circuit substrate 327 is put into a state in which the second circuit substrate 327 is locked to the front side in the installation direction by a locking part 375 (see FIG. 7) that protrudes to the back side in the installation direction from the tape-retention-part front-side peripheral wall part 245.

Here, the first protrusion inclination surface 365 and the second protrusion inclination surface 369 slightly protrude to the +X side compared with the third protrusion inclination surface 371. Therefore, the second circuit substrate 327 is inserted so as to be press-fit between the third peripheral wall inclination surface 351 and the fourth peripheral wall inclination surface 353 and between the first protrusion inclination surface 365 and the second protrusion inclination surface 369. Thus, both edge parts in the Y direction of the first surface 329 of the second circuit substrate 327 come in contact with the third peripheral wall inclination surface 351 and the fourth peripheral wall inclination surface 353. In other words, the second circuit substrate 327 is attached to the second substrate attachment part 337 in a state in which both edge parts in the Y direction of the first surface 329 are positioned in the X direction so as to come in contact with the third peripheral wall inclination surface 351 and the fourth peripheral wall inclination surface 353. Thus, it is possible to reduce a fluctuation in the distance between the connection substrate 81 of the substrate connection part 67 and the first surface 329 of the second circuit substrate 327 among a plurality of ribbon cartridges 201.

Further, as described above, the third peripheral wall inclination surface 351, the fourth peripheral wall inclination surface 353, the first protrusion inclination surface 365, the second protrusion inclination surface 369, and the third protrusion inclination surface 371 are inclined so as to make the back side in the installation direction turned to the −X side with respect to the surface perpendicular to the second back wall part 247. Therefore, the second circuit substrate 327 is attached to the second substrate attachment part 337 in a state in which the first surface 329 is inclined so as to make the back side in the installation direction turned to the −X side with respect to the surface perpendicular to the second back wall part 247. Thus, the contact terminal parts 83 are prevented from getting snagged on the first surface 329 of the second circuit substrate 327 when the ribbon cartridge 201 is removed from the cartridge installation part 7. As a result, it is possible to prevent the breakage of the contact terminal parts 83. Note that the inclination angle of the second circuit substrate 327 is, for example, 4° although not particularly limited.

Further, the second substrate attachment part 337 is provided on the second back-side case 237. That is, the second electrode part 330 of the second circuit substrate 327 attached to the second substrate attachment part 337 is provided at a position close to the back side in the installation direction in the ribbon-side fifth peripheral wall part 225. The ribbon cartridge 201 is less rattled on the back side in the installation direction since it is positioned by the platen shaft 39, the head part 49, or the like cantilevered by the installation bottom surface 37. Therefore, since the second electrode part 330 is provided at a position close to the back side in the installation direction, it is possible to reduce the shift amount of the second electrode part 330 with respect to the contact terminal parts 83.

[Second Convex-Part Reception Part]

The second convex-part reception part 297 will be described on the basis of FIGS. 13, 16, and 17. Since the first convex-part reception part 159 is configured like the second convex-part reception part 297, its description will be omitted. The second convex-part reception part 297 has an opening shape corresponding to the shape of the engagement convex part 51, i.e., a substantially rectangular shape long in the Y direction when seen from the front side in the installation direction. Therefore, the ribbon cartridge 201 is installed in the cartridge installation part 7 in a state in which the second convex-part reception part 297 is positioned with respect to the engagement convex part 51. Note that the shape of the second convex-part reception part 297 when seen from the front side in the installation direction is not limited to the substantially rectangular shape but may be any shape allowing the reception of the engagement convex part 51. The second convex-part reception part 297 has a reception chamfering part 373 (see FIG. 8) at its peripheral edge part on the back side in the installation direction. By the reception chamfering part 373, the engagement convex part 51 is smoothly inserted into the second convex-part reception part 297 when the ribbon cartridge 201 is installed in the cartridge installation part 7.

The interval between the first protrusion attachment wall part 355 and the second protrusion attachment wall part 357 is approximately equal to the dimension in the Y direction of the engagement convex part 51 to such an extent that the reception of the engagement convex part 51 is allowed. Therefore, the engagement convex part 51 is received by the second convex-part reception part 297 in a state in which the second convex-part reception part 297 is positioned in the Y direction with respect to the engagement convex part 51. On the other hand, the interval between the third protrusion attachment wall part 359 and the fourth protrusion attachment wall part 361 is larger than the dimension in the X direction of the engagement convex part 51. In a state in which the engagement convex part 51 is received by the second convex-part reception part 297, the third protrusion attachment wall part 359 comes in contact with the engagement convex part 51 by being pressed to the −X side by the pressing force of the contact terminal parts 83 and as will be described later. Thus, the third protrusion attachment wall part 359 is positioned in the X direction with respect to the engagement convex part 51.

During the installation of the ribbon cartridge 201 in the cartridge installation part 7, the first surface 329 of the second circuit substrate 327 causes, as the ribbon cartridge 201 moves to the back side in the installation direction, the contact terminal parts 83 to displace to the +X side against the pressing force while rubbing against the contact terminal parts 83 of the substrate connection part 67 provided in the cartridge installation part 7.

Then, when the ribbon cartridge 201 are butted against the installation bottom surface 37 and installed in the cartridge installation part 7, the second electrode part 330 of the second circuit substrate 327 comes in contact with the contact terminal parts 83. As a result, the second circuit substrate 327 is pressed to the −X side by the pressing force of the contact terminal parts 83. Further, at this time, the engagement convex part 51 is received by the second convex-part reception part 297. In this state, the second circuit substrate 327 is pressed to the −X side, i.e., the side of the third protrusion attachment wall part 359 by the pressing force of the contact terminal parts 83 and comes in contact with the third protrusion attachment wall part 359. In addition, the third protrusion attachment wall part 359 is pressed to the −X side, i.e., the side of the engagement convex part 51 via the second circuit substrate 327 by the pressing force of the contact terminal parts 83 and comes in contact with the engagement convex part 51. Thus, the pressing force of the contact terminal parts 83 is received by the engagement convex part 51 via the second circuit substrate 327 and the third protrusion attachment wall part 359. Since the position at which the contact terminal parts 83 press the second circuit substrate 327 overlaps the engagement convex part 51 in the installation direction as described above, the engagement convex part 51 is allowed to effectively receive the pressing force of the contact terminal parts 83.

Since the second convex-part reception part 297 receives the engagement convex part 51 as described above, the engagement convex part 51 functions as a part that receives the pressing force of the contact terminal parts 83. Thus, it is possible to prevent the second circuit substrate 327 that has received the pressing force of the contact terminal parts 83 from being bent and deformed. Further, since the pressing force of the contact terminal parts 83 is received by the engagement convex part 51, the second cartridge case 211 is prevented from being rotated by the pressing force of the contact terminal parts 83 and prevented from being inclined with respect to the installation bottom surface 37. Thus, the second paying-out core 206 and the second winding core 207 accommodated in the second cartridge case 211 are prevented from being inclined with respect to the second paying-out shaft 45 and the second winding shaft 47. Accordingly, when the second ink ribbon 205 is fed from the second paying-out core 206 to the second winding core 207, it is possible to prevent the second ink ribbon 205 from becoming wrinkled. Similarly, when the second ink ribbon 205 is rewound from the second winding core 207 to the second paying-out core 206, it is possible to prevent the second ink ribbon 205 from becoming wrinkled.

In addition, since the third protrusion attachment wall part 359 pressed to the −X side by the contact terminal parts 83 comes in contact with the engagement convex part 51, the third protrusion attachment wall part 359 is positioned in the X direction with respect to the engagement convex part 51, whereby the second circuit substrate 327 is positioned in the X direction with respect to the contact terminal parts 83. Therefore, it is possible to reduce a fluctuation in the distance between the connection substrate 81 of the substrate connection part 67 and the first surface 329 of the second circuit substrate 327 among a plurality of ribbon cartridges 201. Thus, it is possible to reduce the displacement amount of the contact terminal parts 83. Therefore, a reduction in the force of the contact terminal parts 83 that press the second circuit substrate 327 and an improvement in the durability of the contact terminal parts 83 with respect to the attachment/detachment operation of the ribbon cartridge 201 are allowed.

[Tape Cartridge]

Figure 18:
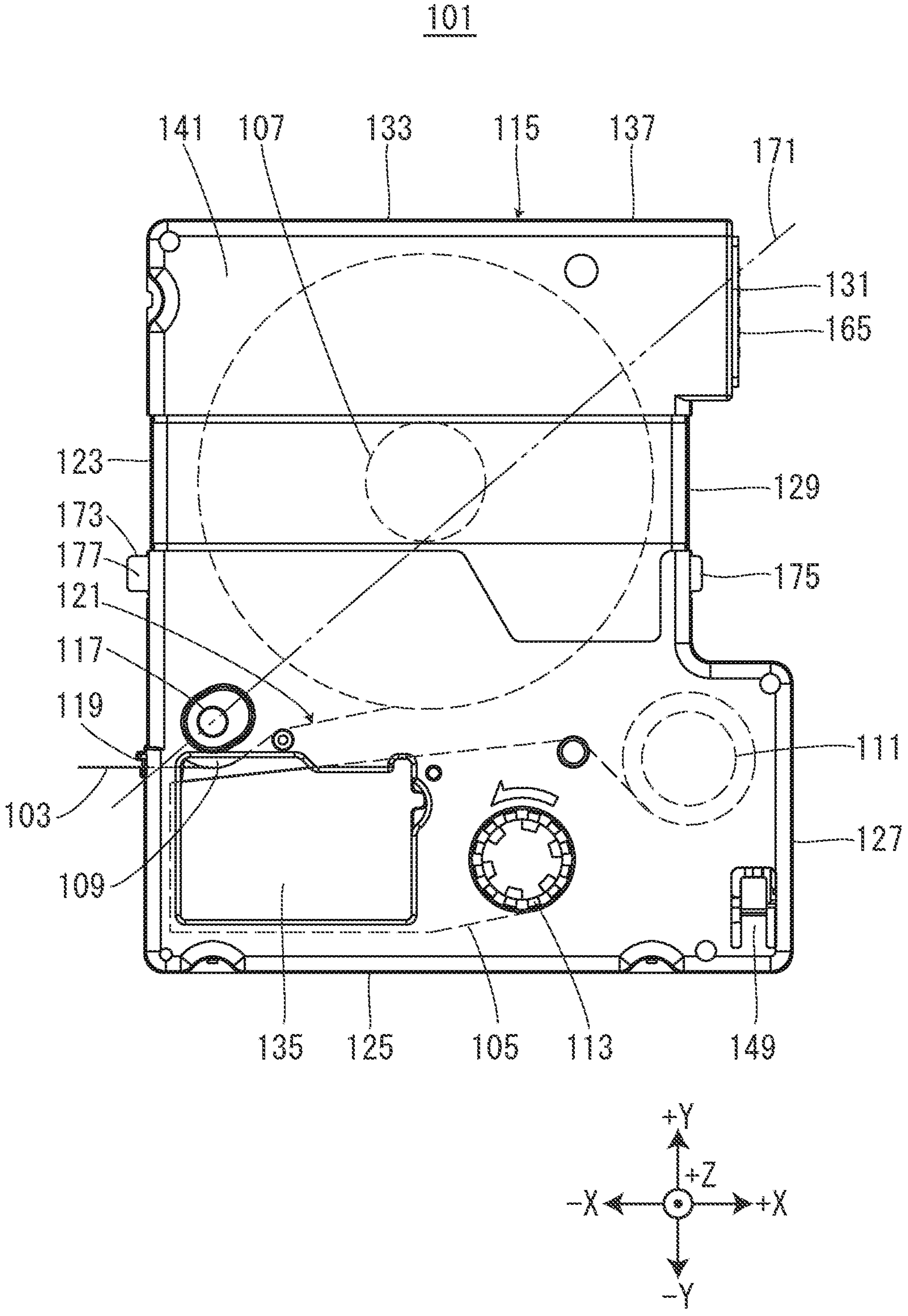
FIG. 18 is a view of the tape cartridge when seen from the front side in the installation direction.
Figure 19:
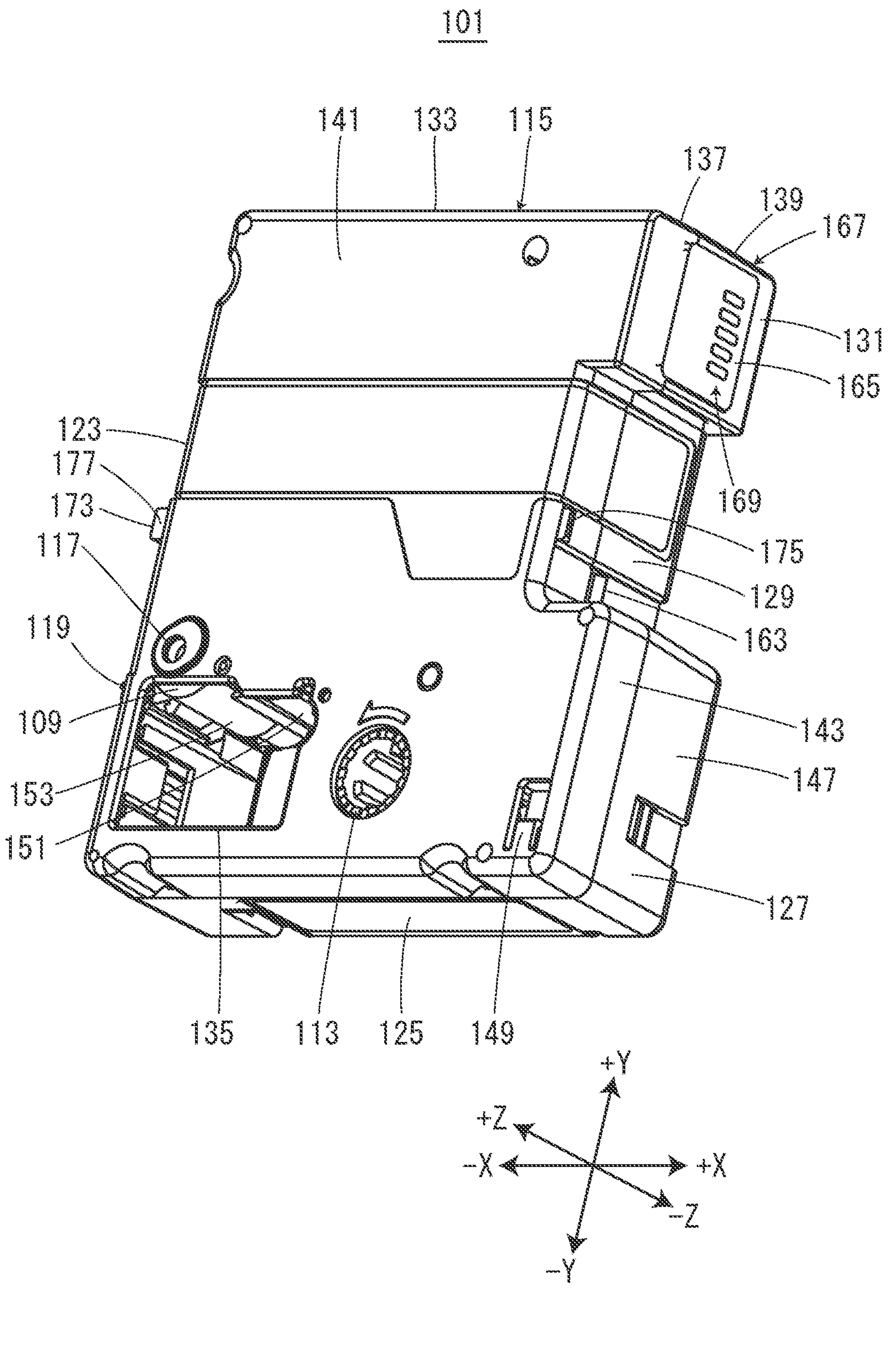
FIG. 19 is a perspective view of the tape cartridge.
Figure 20:
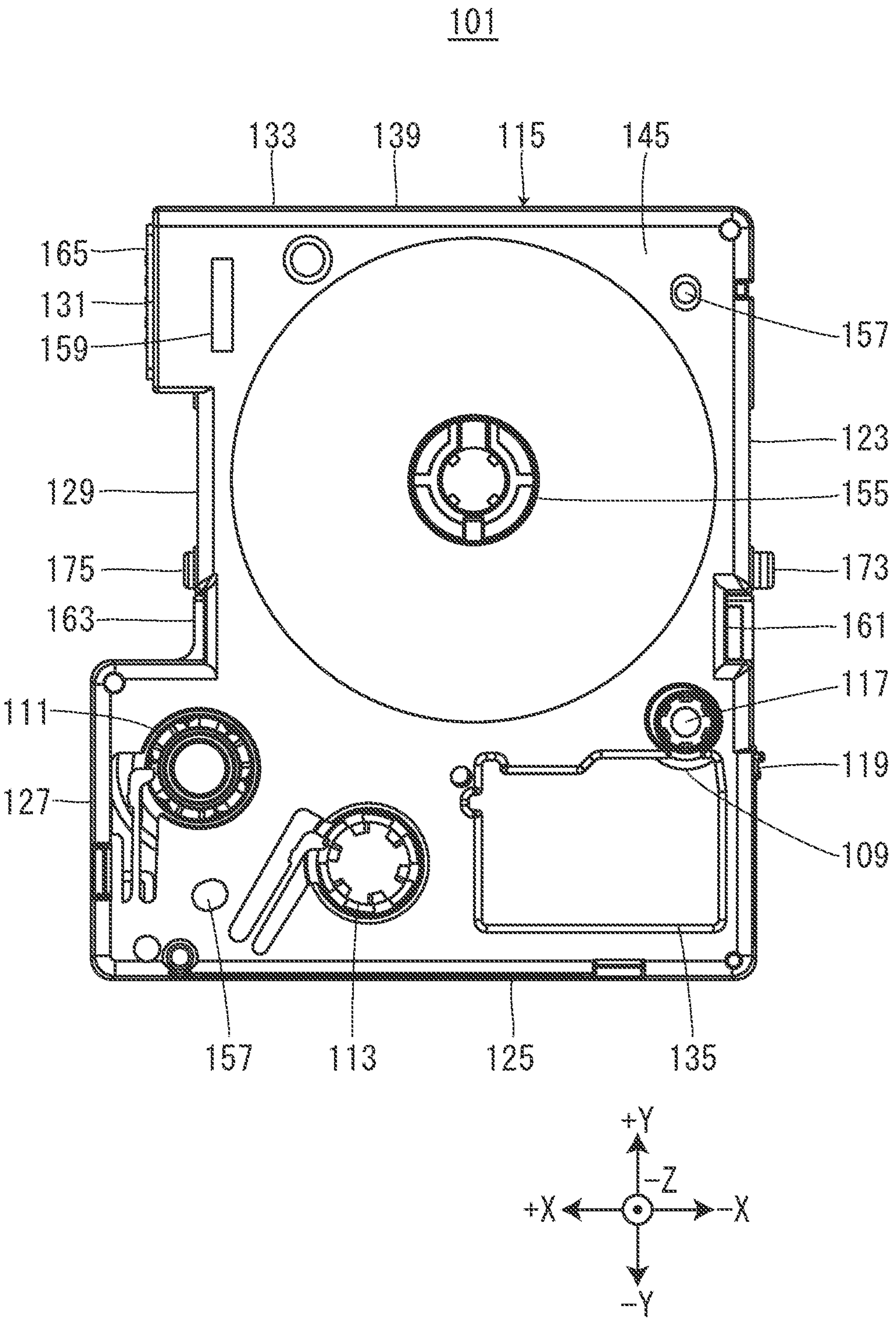
FIG. 20 is a view of the tape cartridge when seen from the back side in the installation direction.

The tape cartridge 101 will be described on the basis of FIGS. 18 to 20. The tape cartridge 101 includes a tape core 107, a first platen roller 109, a first paying-out core 111, a first winding core 113, and a first cartridge case 115 that rotatably accommodates the tape core 107, the first platen roller 109, the first paying-out core 111, and the first winding core 113. The tape core 107, the first platen roller 109, the first paying-out core 111, and the first winding core 113 are, when seen from the front side in the installation direction, provided at positions corresponding to the insertion convex part 53, the platen shaft 39, the first paying-out shaft 41, and the first winding shaft 43 provided in the cartridge installation part 7, respectively. The first platen roller 109 has a first platen shaft insertion hole 117 penetrating in the installation direction.

The first printing tape 103 is wound on the tape core 107. The first printing tape 103 that has been paid out from the tape core 107 is delivered to the outside of the first cartridge case 115 from a tape delivery port 119 provided on a tape-side first peripheral wall part 123 that will be described later. Note that the tape delivery port 119 is an example of a tape ejection port. In the first cartridge case 115, a first tape path 121 ranging from the tape core 107 to the tape delivery port 119 is provided. The first ink ribbon 105 is wound on the first paying-out core 111. The first ink ribbon 105 that has been paid out from the first paying-out core 111 is wound up by the first winding core 113. Note that the first cartridge case 115 includes a plurality of types having different thicknesses, i.e., different dimensions in the installation direction depending on the widths of the accommodated first printing tape 103 and the first ink ribbon 105.

The first cartridge case 115 is, when seen from the front side in the installation direction, formed into a shape obtained by bending both ends of the long sides of a rectangle in the same direction and at a right angle. Here, in the peripheral wall part of the first cartridge case 115, a peripheral wall part on the −X side is defined as the tape-side first peripheral wall part 123. A peripheral wall part extending to the +X side from the end on the −Y side of the tape-side first peripheral wall part 123 is defined as a tape-side second peripheral wall part 125. Peripheral wall parts extending to the +Y side from the end on the +X side of the tape-side second peripheral wall part 125 are defined as a tape-side third peripheral wall part 127, a tape-side fourth peripheral wall part 129, and a tape-side fifth peripheral wall part 131 in an order from the −Y side. The tape-side fourth peripheral wall part 129 is formed into a concave shape with respect to the tape-side third peripheral wall part 127 and the tape-side fifth peripheral wall part 131. A peripheral wall part extending to the −X side from the end on the +Y side of the tape-side fifth peripheral wall part 131 is defined as a tape-side sixth peripheral wall part 133. The end on the −X side of the tape-side sixth peripheral wall part 133 is connected to the end on the +Y side of the tape-side first peripheral wall part 123.

The first cartridge case 115 has a first head insertion hole 135 provided to penetrate in the installation direction. The first head insertion hole 135 is, when seen from the front side in the installation direction, positioned at a corner part at which the tape-side first peripheral wall part 123 and the tape-side second peripheral wall part 125 cross each other. The first head insertion hole 135 is, when seen from the front side in the installation direction, formed into a shape corresponding to the head cover 56, i.e., a substantially rectangular shape. When the tape cartridge 101 is attached to and detached from the cartridge installation part 7, the first head insertion hole 135 and the first platen shaft insertion hole 117 position the tape cartridge 101 and guide the attachment and detachment of the tape cartridge 101.

The first cartridge case 115 includes a first front-side case 137 and a first back-side case 139. When the tape cartridge 101 is installed in the cartridge installation part 7, the first front-side case 137 and the first back-side case 139 are arranged on the front side and the back side in the installation direction, respectively. The first front-side case 137 is a resin-molded article having translucency, and the first back-side case 139 is a resin-molded article having no translucency. However, the materials and manufacturing methods of the first front-side case 137 and the first back-side case 139 are not limited to those described above.

The first front-side case 137 includes a first front-side wall part 141 and a first front-side peripheral wall part 143 protruding to the back side in the installation direction from the peripheral edge part of the first front-side wall part 141. The first back-side case 139 includes a first back wall part 145 and a first back-side peripheral wall part 147 protruding to the front side in the installation direction from the peripheral edge part of the first back wall part 145. The first front-side case 137 and the first back-side case 139 are combined together with the first front-side peripheral wall part 143 and the first back-side peripheral wall part 147 butted against each other.

The first front-side wall part 141 has an elastic part 149 at its corner part at which the tape-side second peripheral wall part 125 and the tape-side third peripheral wall part 127 cross each other. The elastic part 149 is, when seen from the front side in the installation direction, formed as a substantially rectangular part obtained by cutting off a part of the first front-side wall part 141 into a "U"-shape. When the installation-part cover 5 is closed in a state in which the tape cartridge 101 is installed in the cartridge installation part 7, the second pressing protrusion 20 provided on the installation-part cover 5 is butted against the elastic part 149 to cause the displacement of the elastic part 149 to the back side in the installation direction. A pressing force accompanied by the elastic displacement of the elastic part 149 is received by the second pressing protrusion 20. As a result, the tape cartridge 101 is pressed to the back side in the installation direction. Thus, the tape cartridge 101 is prevented from being installed in a state of floating from the installation bottom surface 37.

The first back wall part 145 has a first head peripheral edge convex part 151 provided to protrude to the front side in the installation direction from the peripheral edge part of the first head insertion hole 135. The first head peripheral edge convex part 151 is notched on the +Y side, i.e., at its part on the side of the first platen roller 109, and the notched portion serves as a first ribbon exposure part 153 at which the first ink ribbon 105 is exposed. However, in FIG. 19 showing the first ribbon exposure part 153, the first ink ribbon 105 is omitted. In a state in which the tape cartridge 101 is installed in the cartridge installation part 7, the printing head 55 that has been inserted into the first head insertion hole 135 faces the first platen roller 109 with the first ink ribbon 105 and the first printing tape 103 sandwiched between the printing head 55 and the first platen roller 109.

The first back wall part 145 has a first cylindrical shaft part 155 provided to protrude to the front side in the installation direction. The first cylindrical shaft part 155 is formed into a substantially-stepped cylindrical shape, and rotatably supports the tape core 107. In a state in which the tape cartridge 101 is installed in the cartridge installation part 7, the insertion convex part 53 provided in the cartridge installation part 7 is inserted into the first cylindrical shaft part 155 provided in the tape cartridge 101.

Further, the first back wall part 145 has, on its surface on the back side in the installation direction, a plurality of first positioning holes 157 provided to be on a diagonal line. In a state in which the tape cartridge 101 is installed in the cartridge installation part 7, the first positioning holes 157 provided on the tape cartridge 101 engage the positioning pins 65 provided in the cartridge installation part 7. Thus, the tape cartridge 101 is positioned with respect to the cartridge installation part 7.

In addition, the first back wall part 145 has a first convex-part reception part 159 at a position at which the tape-side fifth peripheral wall part 131 and the tape-side sixth peripheral wall part 133 cross each other. In a state in which the tape cartridge 101 is installed in the cartridge installation part 7, the first convex-part reception part 159 provided in the tape cartridge 101 receives the engagement convex part 51 provided in the cartridge installation part 7.

In the first back-side peripheral wall part 147, the tape-side first peripheral wall part 123 has a tape-side first hook engagement part 161, and the tape-side fourth peripheral wall part 129 has a tape-side second hook engagement part 163. In a state in which the tape cartridge 101 is installed in the cartridge installation part 7, the tape-side first hook engagement part 161 and the tape-side second hook engagement part 163 provided in the tape cartridge 101 engage the first hook 57 and the second hook 59 provided in the cartridge installation part 7, respectively. Thus, the tape cartridge 101 is prevented from being installed in a state of floating from the installation bottom surface 37. Further, in the first back-side peripheral wall part 147, the tape-side fifth peripheral wall part 131 has a first circuit substrate 165. That is, the first circuit substrate 165 is attached to the tape-side fifth peripheral wall part 131 provided to be substantially parallel to the tape-side first peripheral wall part 123 on which the tape delivery port 119 is provided. The tape-side fifth peripheral wall part 131 has a first substrate attachment part 167 to which the first circuit substrate 165 is attached.

A first gripping part 173 protrudes to the −X side from the tape-side first peripheral wall part 123, and a second gripping part 175 protrudes from the tape-side fourth peripheral wall part 129. The first gripping part 173 and the second gripping part 175 are, when seen from the front side in the installation direction, provided at a substantially intermediate part in the Y direction in the whole first cartridge case 115. The first gripping part 173 and the second gripping part 175 serve as hooking parts used when the user grips the tape cartridge 101. Here, the surface on the front side in the installation direction of the first gripping part 173 is defined as a sixth pressing part 177. When the installation-part cover 5 is closed in a state in which the ribbon cartridge 201 is installed in the cartridge installation part 7, the sixth pressing protrusion (see FIG. 2) provided on the installation-part cover 5 is butted against the sixth pressing part 177. Thus, the sixth pressing part 177 is pressed to the back side in the installation direction by the sixth pressing protrusion 24.

[Printing Processing Performed when Tape Cartridge is Installed]

Figure 21:
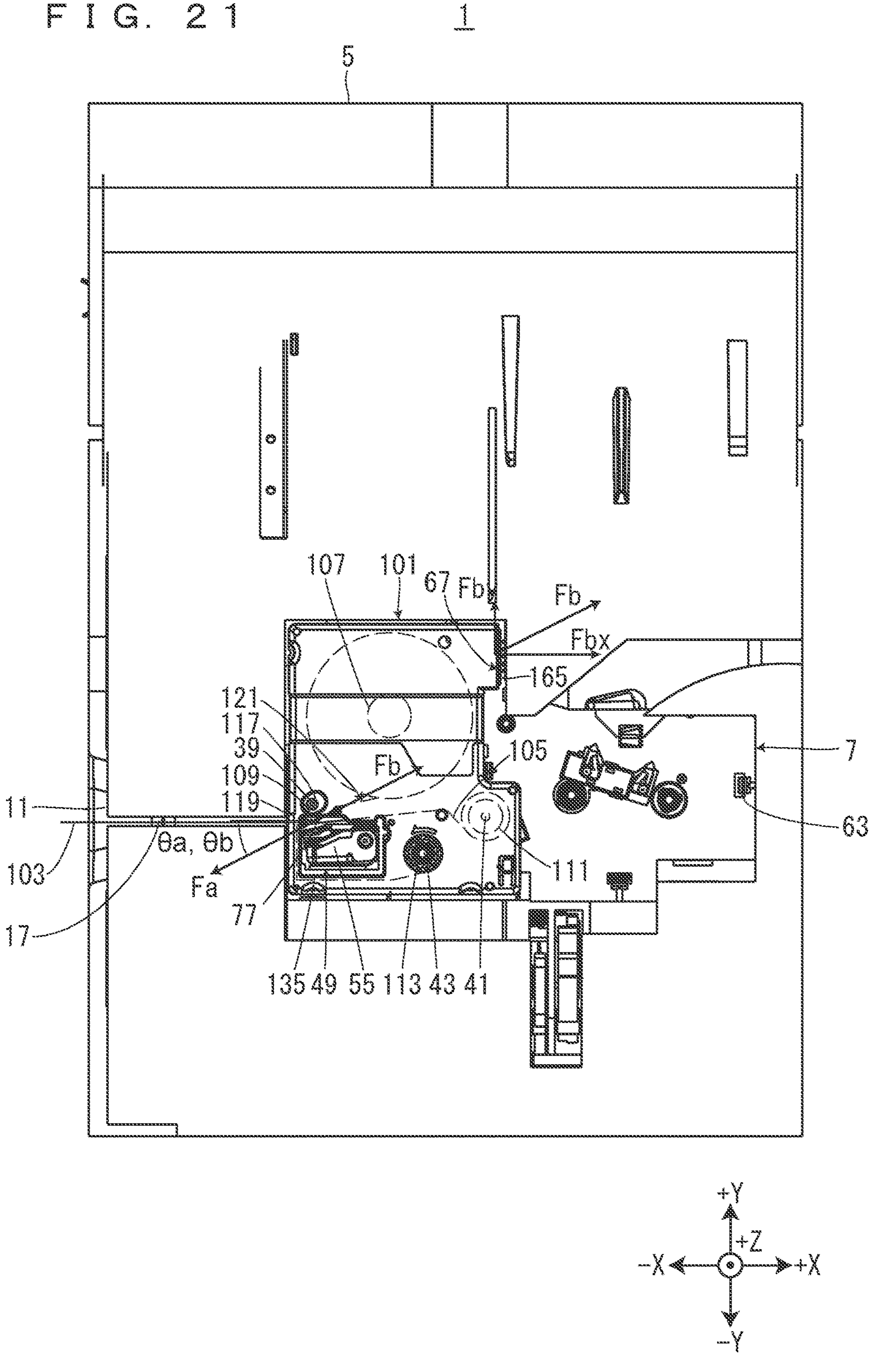
FIG. 21 is a view for describing printing processing performed by the tape printing device in a state in which the tape cartridge is installed in the cartridge installation part.

Printing processing performed by the tape printing device 1 in a state in which the tape cartridge 101 is installed in the cartridge installation part 7 will be described on the basis of FIG. 21. In a state in which the tape cartridge 101 is installed in the cartridge installation part 7, the platen shaft 39, the first paying-out shaft 41, and the first winding shaft 43 provided in the cartridge installation part 7 are inserted into the first platen shaft insertion hole 117 of the first platen roller 109, the first paying-out core 111, and the first winding core 113 provided in the tape cartridge 101, respectively. Thus, the driving force of the feeding motor (not shown in the figure) provided in the tape printing device 1 becomes transmissible to the first platen roller 109, the first paying-out core 111, and the first winding core 113.

Further, in a state in which the tape cartridge 101 is installed in the cartridge installation part 7, the head part 49 provided in the cartridge installation part 7 is inserted into the first head insertion hole 135 provided on the tape cartridge 101. When the installation-part cover 5 is closed after the installation of the tape cartridge 101 in the cartridge installation part 7, the printing head 55 is caused to move to the platen shaft 39 by the head movement mechanism (not shown in the figure). Thus, the first printing tape 103 and the first ink ribbon 105 are sandwiched between the printing head 55 and the first platen roller 109. Note that a portion at which the first platen roller 109 sandwiches the first printing tape 103 and the first ink ribbon 105 between the first platen roller 109 and the printing head 55 is defined as a first feeding portion 77.

When the feeding motor rotates in a normal direction in this state, the first platen roller 109 rotates in the normal direction and the first winding core 113 rotates in a winding direction. Thus, the first printing tape 103 that has been paid out from the tape core 107 is fed to the device-side tape ejection port 11 via the tape delivery port 119, and the first ink ribbon 105 that has been paid out from the first paying-out core 111 is wound up by the first winding core 113.

Further, when the feeding motor rotates in a reverse direction opposite to the normal direction, the first platen roller 109 rotates in the reverse direction opposite to the normal direction and the first paying-out core 111 rotates in a rewinding direction. Thus, the first printing tape 103 that has been ejected from the tape delivery port 119 is returned to the inside of the first cartridge case, and the first ink ribbon 105 that has been paid out from the first paying-out core 111 is rewound on the first paying-out core 111. As described above, the first paying-out shaft 41 inserted into the first paying-out core 111 and the first winding shaft 43 inserted into the first winding core 113 constitute a first ink ribbon transportation mechanism that feeds the first ink ribbon 105.

By rotating the feeding motor in the normal direction and heating the printing head 55, the tape printing device 1 prints printing information input via the keyboard or the like on the first printing tape 103 while feeding the first printing tape 103 and the first ink ribbon 105. After the completion of the printing, the tape printing device 1 causes the cutter 17 to perform a cutting operation to cut off a printed portion of the first printing tape 103. Then, by rotating the feeding motor in the reverse direction, the tape printing device 1 returns the first printing tape 103 until the tip end of the first printing tape 103 comes to the vicinity of a position at which the tip end is sandwiched between the printing head 55 and the first platen roller 109, i.e., the vicinity of a printing position. Thus, it is possible to reduce a margin to be created on the front side in the length direction of the first printing tape 103 that is to be next printed since the printing head 55 and the cutter 17 are separated from each other.

Here, a force applied by the first platen roller 109 to the first printing tape 103 at the first feeding portion 77 is defined as a first feeding force Fa. The direction of the first feeding force Fa, i.e., a direction in which the first printing tape 103 is fed at the first feeding portion 77 when the first printing tape 103 is fed toward the device-side tape ejection port 11 is defined as a first feeding direction. The first feeding direction is orthogonal to a direction in which the printing head 55 sandwiches the first printing tape 103 between the printing head 55 and the first platen roller 109. Further, a force acting on the tape cartridge 101 as the reaction force of the first feeding force Fa is defined as a first feeding reaction force Fb. The first feeding reaction force Fb increases when the feeding speed of the first printing tape 103 accelerates. On the other hand, since the tension of the first printing tape 103 disappears when the feeding speed of the first printing tape 103 decelerates, the first feeding reaction force Fb also disappears.

An angle formed by the first feeding direction with respect to a direction in which the first circuit substrate 165 receives a force from the contact terminal parts 83 (see FIG. 11) of the substrate connection part 67, i.e., the −X direction when seen from the front side in the installation direction is defined as a first feeding angle θa. Note that an angle formed by the direction of the first tape path 121 at the first feeding portion 77 with respect to the direction in which the first circuit substrate 165 receives the force from the contact terminal parts 83 when seen from the front side in the installation direction is defined as a first path angle θb. The first path angle θb is approximately equal to the first feeding angle θa.

The first feeding angle θa and the first path angle θb are preferably less than 45°. Since the first feeding angle θa and the first path angle θb are less than 45°, a vector component Fbx in the X direction, i.e., a vector component in a direction in which the first circuit substrate 165 is pressed against the contact terminal parts 83 among the vector components of the first feeding reaction force Fb becomes larger than a vector component Fby in the Y direction, i.e., a vector component in a direction in which the first circuit substrate 165 is shifted with respect to the contact terminal parts 83. Thus, it is possible to prevent the first circuit substrate 165 from being shifted in the Y direction with respect to the contact terminal parts 83. The first feeding angle θa may be replaced as an entering angle at which the first printing tape 103 enters the first platen roller 109. At a stage at which the first printing tape 103 has not been used, the diameter of the first printing tape 103 wound on the tape core 107 is large. As the first printing tape 103 is used, the diameter of the first printing tape 103 wound on the tape core 107 becomes smaller. Therefore, the entering angle increases as the first printing tape 103 is used. The entering angle is set at an angle less than 45° even where the diameter of the first printing tape 103 changes. However, in a case in which the diameter of the tape core 107 is small, the entering angle will exceed 45° near the end of the first printing tape 103. However, an entering angle less than 45° is included in the present invention.

Other Modified Examples

The tape printing device 1, the tape cartridge 101, and the ribbon cartridge 201 are not limited to the above embodiments but may employ various configurations without departing from the spirit as a matter of course. For example, the above embodiments are capable of being modified into the following modes.

The tape cartridge 101 may be configured not to include the first circuit substrate 165. Similarly, the ribbon cartridge 201 may be configured not to include the second circuit substrate 327.

Figure 22:
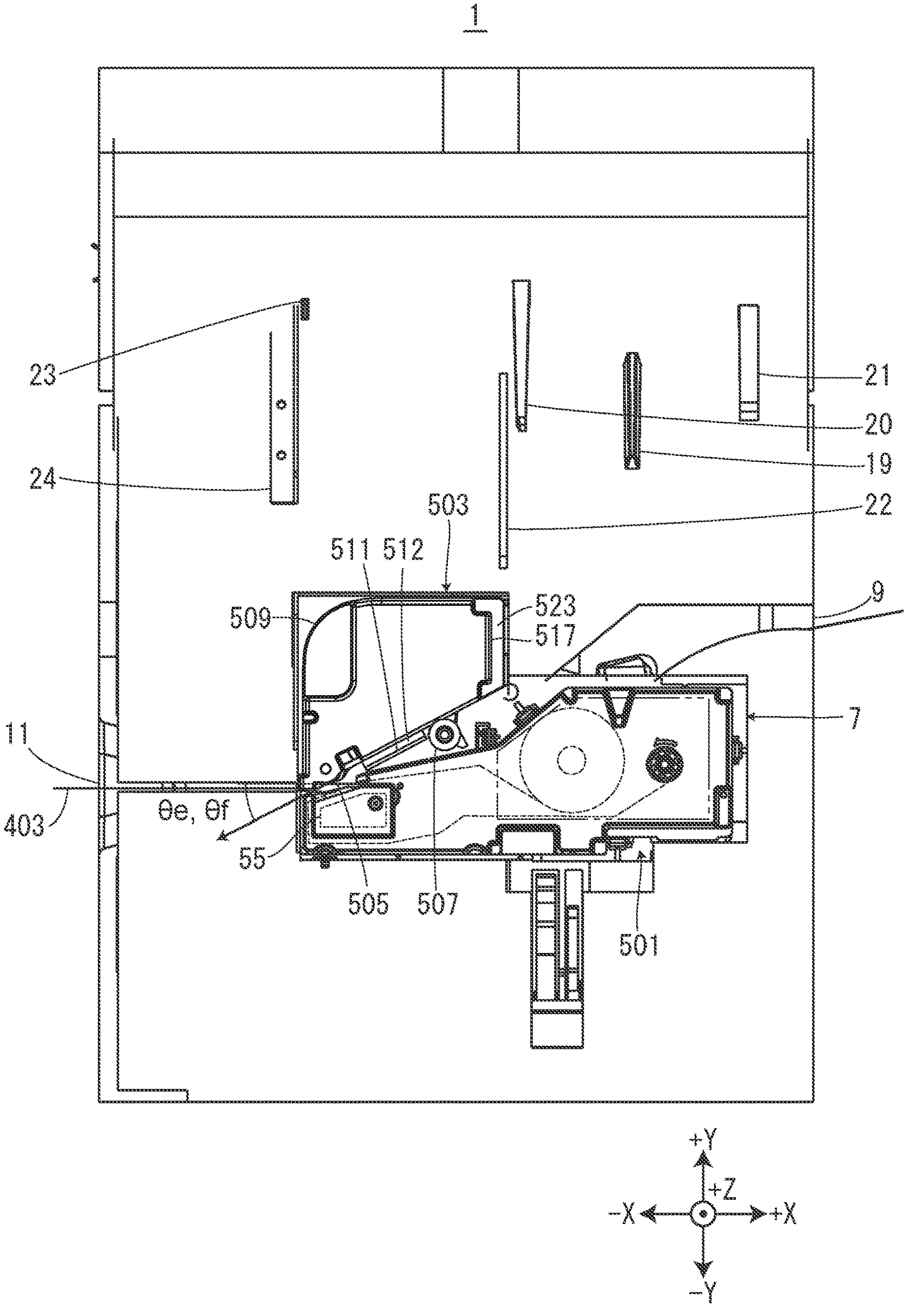
FIG. 22 is a view of the tape printing device with an ink ribbon accommodation cartridge and a tape guide cartridge installed therein when seen from the front side in the installation direction.

The ribbon cartridge 201 is not limited to a configuration in which the ink ribbon accommodation part 253 and the tape-retention-mechanism accommodation part 255 are integrally formed but may employ a configuration in which the ribbon cartridge 201 is separable into the ink ribbon accommodation part 253 and the tape-retention-mechanism accommodation part 255. Further, as shown in FIG. 22, an ink ribbon accommodation cartridge 501 and a tape guide cartridge 503 may be configured to be installed in the cartridge installation part 7 instead of the ribbon cartridge 201. The ink ribbon accommodation cartridge 501 is configured to be substantially the same as the ink ribbon accommodation part 253 of the ribbon cartridge 201, and the tape guide cartridge 503 is configured to be substantially the same as the tape-retention-mechanism accommodation part 255 of the ribbon cartridge 201.

Figure 23:
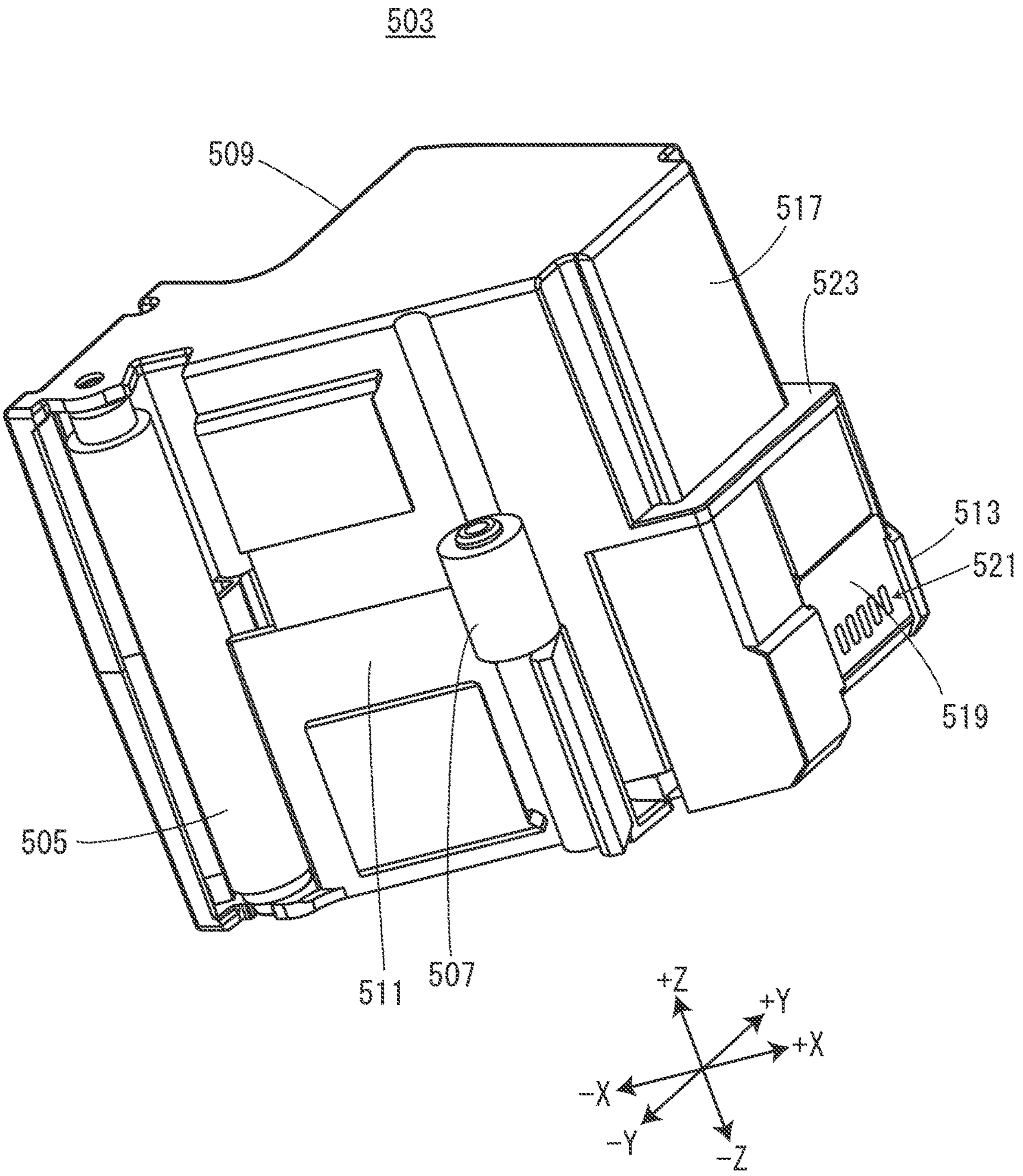
FIG. 23 is a perspective view of the tape guide cartridge.
Figure 24:
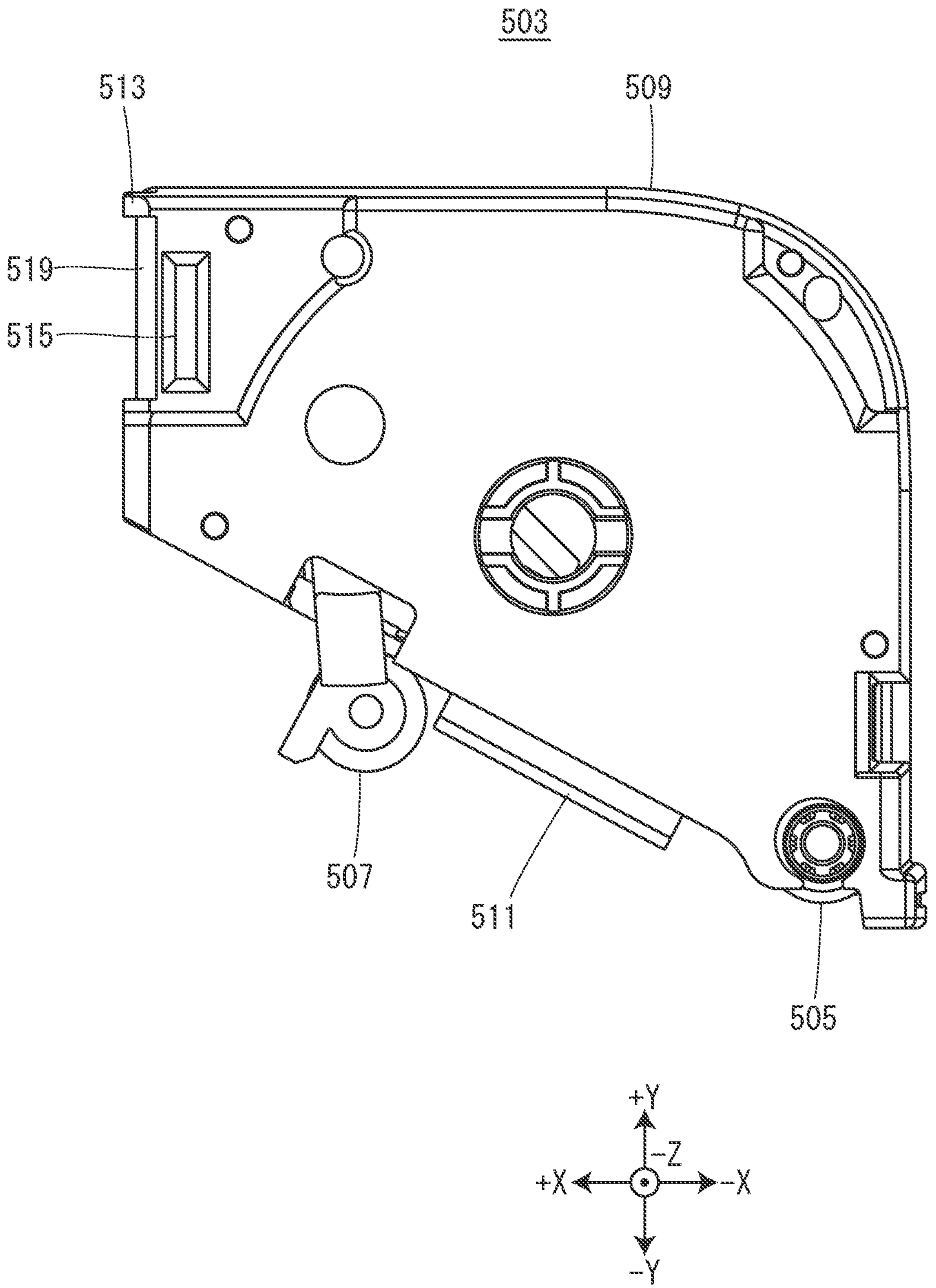
FIG. 24 is a view of the tape guide cartridge when seen from the back side in the installation direction.

As shown in FIGS. 22 to 24, the tape guide cartridge 503 includes a third platen roller 505, a tape sandwiching part 507, and a third cartridge case 509. Like the second platen roller 203, the third platen roller 505 sandwiches the second printing tape 403 between the third platen roller 505 and the printing head 55 and feeds the second printing tape 403. The tape sandwiching part 507 sandwiches the second printing tape 403 between the tape sandwiching part 507 and the peripheral wall part of the third cartridge case 509. The tape guide cartridge 503 is installed in the cartridge installation part 7 with the second printing tape 403 retained by the tape sandwiching part 507.

The third cartridge case 509 has a tape guide 511, a third substrate attachment part 513, a third convex-part reception part 515, and a fourth peripheral wall concave part 517. The tape guide 511 guides the second printing tape 403 that has been introduced from the device-side tape introduction port 9. Between the tape guide 511 and the peripheral wall part of the third cartridge case 509, a third tape path 512 to which the second printing tape 403 is fed is formed. The third substrate attachment part 513 is configured like the first substrate attachment part 167 or the second substrate attachment part 337. A third circuit substrate 519 configured like the first circuit substrate 165 or the second circuit substrate 327 is attached to the third substrate attachment part 513. When the tape guide cartridge 503 is installed in the cartridge installation part 7, the contact terminal parts 83 come in contact with a third electrode part 521 of the third circuit substrate 519. The third convex-part reception part 515 receives the engagement convex part 51 like the first convex-part reception part 159 or the second convex-part reception part 297. The fourth peripheral wall concave part 517 is configured like the fourth peripheral wall concave part 272 provided in the ribbon cartridge 201. That is, the surface on the front side in the installation direction of the fourth peripheral wall concave part 517 serves as a fourth pressing part 523 pressed by the fourth pressing protrusion 22 when the installation-part cover 5 is closed.

As shown in FIG. 22, a third feeding angle θe and a third path angle θf are preferably less than 45°. Note that the third feeding angle θe is defined like the first feeding angle θa or the second feeding angle θc, and the third path angle θf is defined like the first path angle θb or the second path angle θd.

Besides a configuration in which the third protrusion attachment wall part 359 is provided between the second circuit substrate 327 and the engagement convex part 51, a configuration in which the second circuit substrate 327 and the engagement convex part 51 come in direct contact with each other may be employed in a state in which the ribbon cartridge 201 is installed in the cartridge installation part 7.

Cartridges are not limited to those having a configuration in which a printing tape or an ink ribbon is accommodated such as the tape cartridge 101 and the ribbon cartridge 201 of the present embodiment, but may only be required to have a configuration that allows the cartridges to be installed in the tape printing device 1.

The ribbon cartridge 201 may not have the tape retention part 305. At this time, the second tape path 257 preferably has a guide part for guiding both ends in the width direction of the second printing tape, i.e., both the +Z side and the −Z side of the second printing tape. By the provision of the guide part, the printing tape 403 that has been introduced into the second tape path 257 in advance is prevented from being pulled out from the second tape path 257 when the ribbon cartridge 201 is installed in the cartridge installation part 7.

Further, the above embodiments and the modified examples may be combined together.

[Supplementary Notes]

Hereinafter, a cartridge will be supplementally noted.

A cartridge to be installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case, the cartridge including: a cartridge case, the cartridge case having a cartridge-side tape introduction port that introduces the printing tape introduced from the device-side tape introduction port into the cartridge case and a cartridge-side tape ejection port that ejects the printing tape to the outside of the cartridge case toward the device-side tape ejection port in a state in which the cartridge is installed in the cartridge installation part, the cartridge including a tape retention part that retains the printing tape that is introduced in advance into a tape path between the cartridge-side tape introduction port and the cartridge-side tape ejection port before the cartridge is installed in the cartridge installation part.

According to the configuration, the printing tape that has been introduced in advance into the tape path is prevented from being pulled out from the tape path when the cartridge is installed in the cartridge installation part. Therefore, a user is allowed to simultaneously set the printing tape and the cartridge in the tape printing device by the simple operation of installing the cartridge in which the printing tape has been introduced into the tape path in advance in the cartridge installation part.

In this case, the tape retention part preferably has a retention tip end.

According to the configuration, it is possible to prevent the printing tape that has been introduced into the tape path from being pulled out from the tape path and reduce friction resistance applied to the printing tape when the printing tape is fed in the tape path.

In this case, the cartridge preferably includes: an ink ribbon accommodation part that accommodates an ink ribbon; and a tape-retention-mechanism accommodation part that accommodates a tape retention mechanism including the retention tip end, and the tape path is preferably provided between the ink ribbon accommodation part and the tape-retention-mechanism accommodation part.

According to the configuration, it is possible to retain the printing tape that has been introduced into the tape path between the retention tip end accommodated in the tape-retention-mechanism accommodation part and the ink ribbon accommodation part.

In this case, the cartridge case preferably includes a first case that constitutes a front side of the ink ribbon accommodation part in an installation direction of the cartridge, a second case that constitutes a front side of the tape-retention-mechanism accommodation part in the installation direction, and a third case that constitutes back sides of the ink ribbon accommodation part and the tape-retention-mechanism accommodation part in the installation direction.

According to the configuration, it is possible to constitute the tape path between the first case that constitutes the ink ribbon accommodation part and the second case that accommodates the tape-retention-mechanism accommodation part.

In this case, the cartridge preferably includes a platen roller that feeds the printing tape, the platen roller preferably has a platen shaft insertion hole into which a platen shaft provided in the cartridge installation part is inserted when the cartridge is installed in the cartridge installation part, and the cartridge case preferably has a head insertion hole into which the printing head is inserted when the cartridge is installed in the cartridge installation part.

According to the configuration, the platen shaft insertion hole and the head insertion hole position the cartridge and guide the attachment and detachment of the cartridge when the cartridge is installed in the cartridge installation part. Accordingly, the user is allowed to install the cartridge at an appropriate position and smoothly attach and detach the cartridge even in a state in which the printing tape is introduced into the tape path.

In this case, the cartridge-side tape introduction port and the cartridge-side tape ejection port are preferably formed into a slit shape along the installation direction of the cartridge.

According to the configuration, the printing tape that has been introduced into the tape path is fed with its width direction substantially parallel to the installation direction.

EXPLANATION OF REFERENCE SYMBOLS

1: tape printing device
3: device case
7: cartridge installation part
9: device-side tape introduction port
11: device-side tape ejection port
39: platen shaft
55: printing head
201: ribbon cartridge
203: second platen roller
205: second ink ribbon
209: retention tip end
211: second cartridge case
213: second platen shaft insertion hole
231: second head insertion hole
233: ribbon-part front-side case
235: tape-retention-part front-side case
237: second back-side case
253: ink ribbon accommodation part
255: tape-retention-mechanism accommodation part
257: second tape path
259: cartridge-side tape introduction port
261: cartridge-side tape ejection port
305: tape retention part
403: second printing tape

The invention claimed is:

1. A cartridge to be installed in a tape printing device including a cartridge installation part, a printing head that is provided in the cartridge installation part and performs printing on a printing tape, and a device case, the device case having a device-side tape introduction port that introduces the printing tape from an outside to an inside of the device case and a device-side tape ejection port that ejects the printing tape to the outside of the device case, the cartridge comprising:

a cartridge case, the cartridge case having a cartridge-side tape introduction port that introduces the printing tape introduced from the device-side tape introduction port into the cartridge case and a cartridge-side tape ejection port that ejects the printing tape to the outside of the cartridge case toward the device-side tape ejection port in a state in which the cartridge is installed in the cartridge installation part, the cartridge case including a front-side case and a back-side case, the front-side case having a ribbon-part front-side case and a tape-retention-part front-side case, the cartridge including a tape retention part that retains the printing tape that is introduced in advance into a tape path between the cartridge-side tape introduction port and the cartridge-side tape ejection port before the cartridge is installed in the cartridge installation part, the tape path being provided between the ribbon-part front-side case and the tape-retention-part front-side case.

2. The cartridge according to claim 1, wherein the tape retention part has a retention tip end.

3. The cartridge according to claim 2, comprising:

an ink ribbon accommodation part that accommodates an ink ribbon; and a tape-retention-mechanism accommodation part that accommodates a tape retention mechanism including the retention tip end, wherein the tape path is provided between the ink ribbon accommodation part and the tape-retention-mechanism accommodation part.

4. The cartridge according to claim 3, wherein the cartridge case includes a first case that constitutes a front side of the ink ribbon accommodation part in an installation direction of the cartridge, a second case that constitutes a front side of the tape-retention-mechanism accommodation part in the installation direction, and a third case that constitutes back sides of the ink ribbon accommodation part and the tape-retention-mechanism accommodation part in the installation direction.

5. The cartridge according to claim 1, comprising:

a platen roller that feeds the printing tape, wherein the platen roller has a platen shaft insertion hole into which a platen shaft provided in the cartridge installation part is inserted when the cartridge is installed in the cartridge installation part, and the cartridge case has a head insertion hole into which the printing head is inserted when the cartridge is installed in the cartridge installation part.

6. The cartridge according to claim 1, wherein the cartridge-side tape introduction port and the cartridge-side tape ejection port are formed into a slit shape along the installation direction of the cartridge.

* * * * *